July 26, 1960
F. R. SWANSON ET AL
2,946,249
STEP-TURNING LATHES
Filed July 13, 1955
12 Sheets-Sheet 2
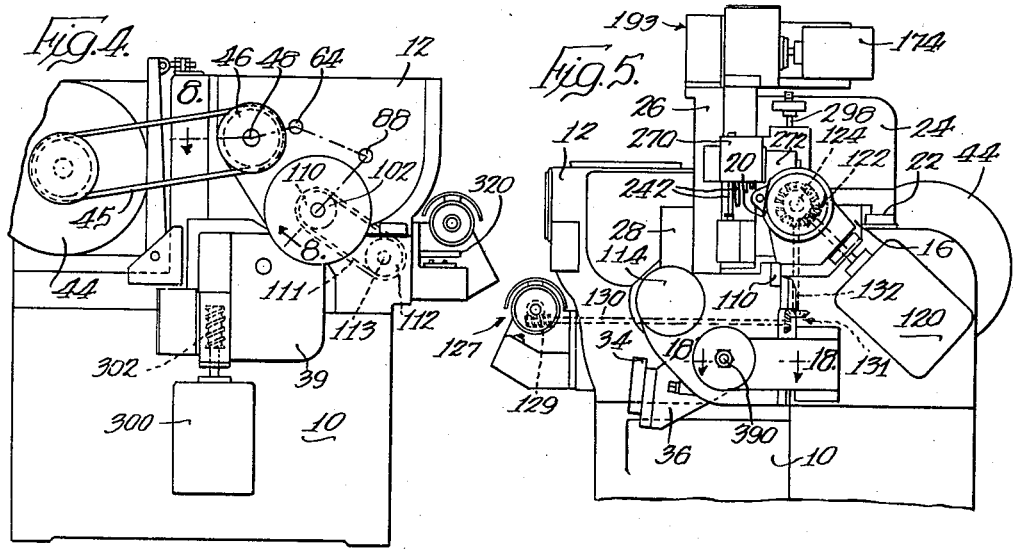
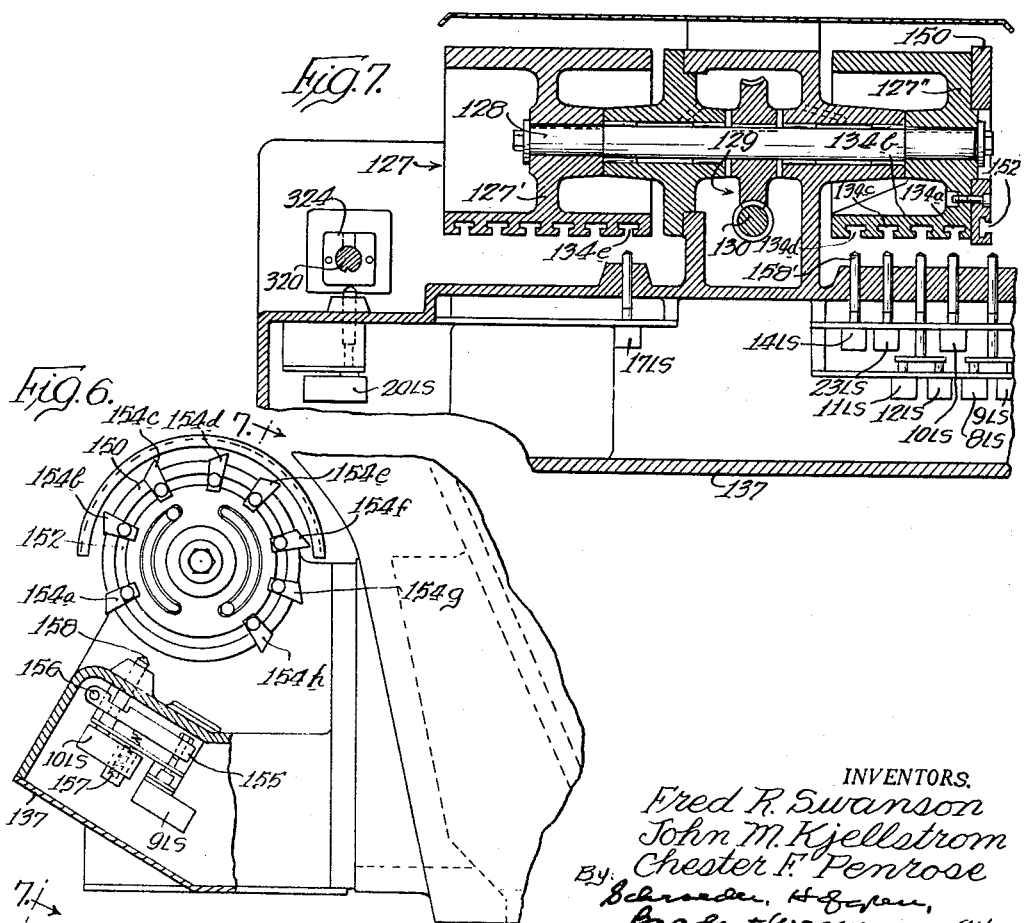
INVENTORS.
Fred R. Swanson
John M. Kjellstrom
Chester F. Penrose
BY Schroeder, Hofgren,
Brady & Wegner
Attys.

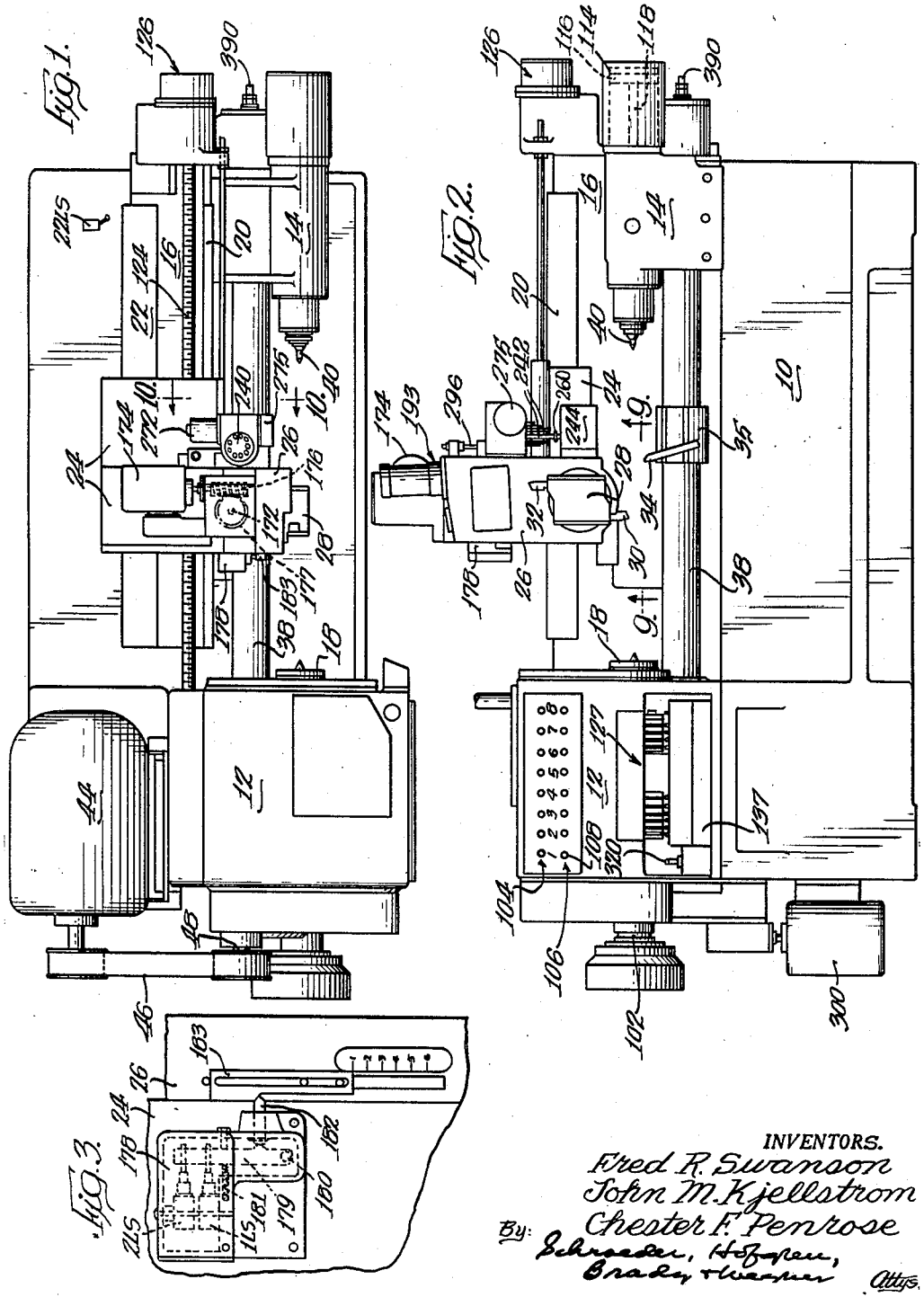

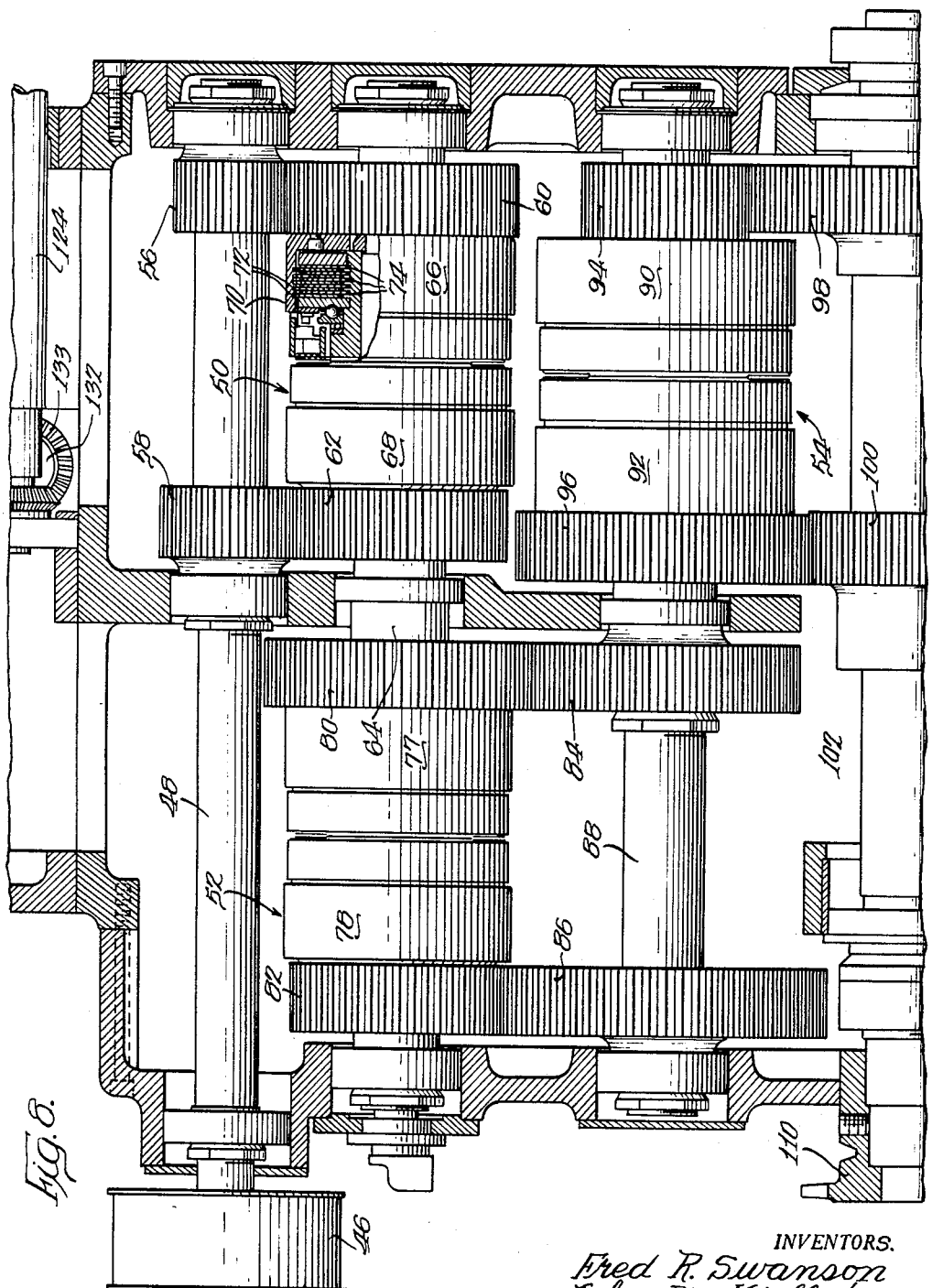

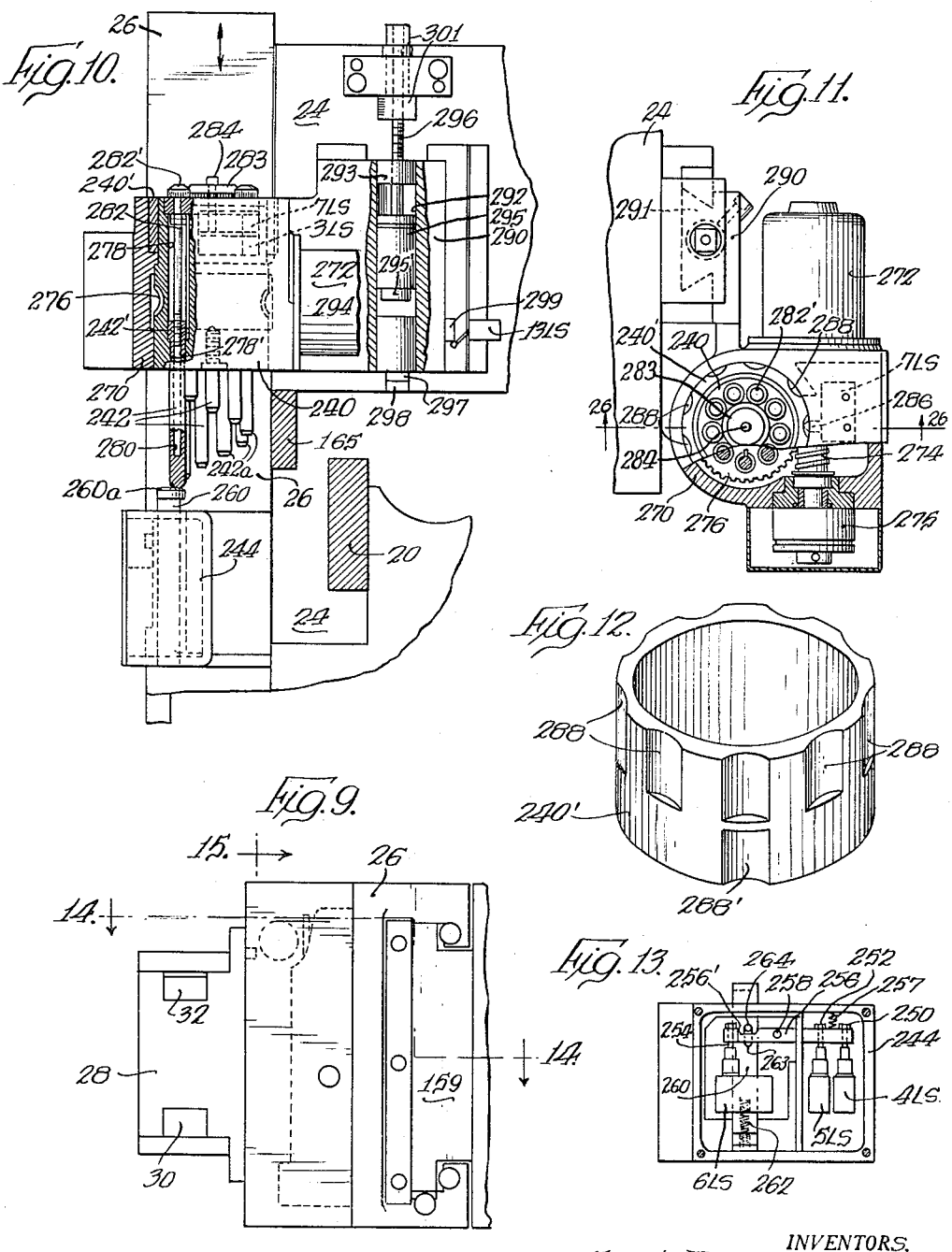

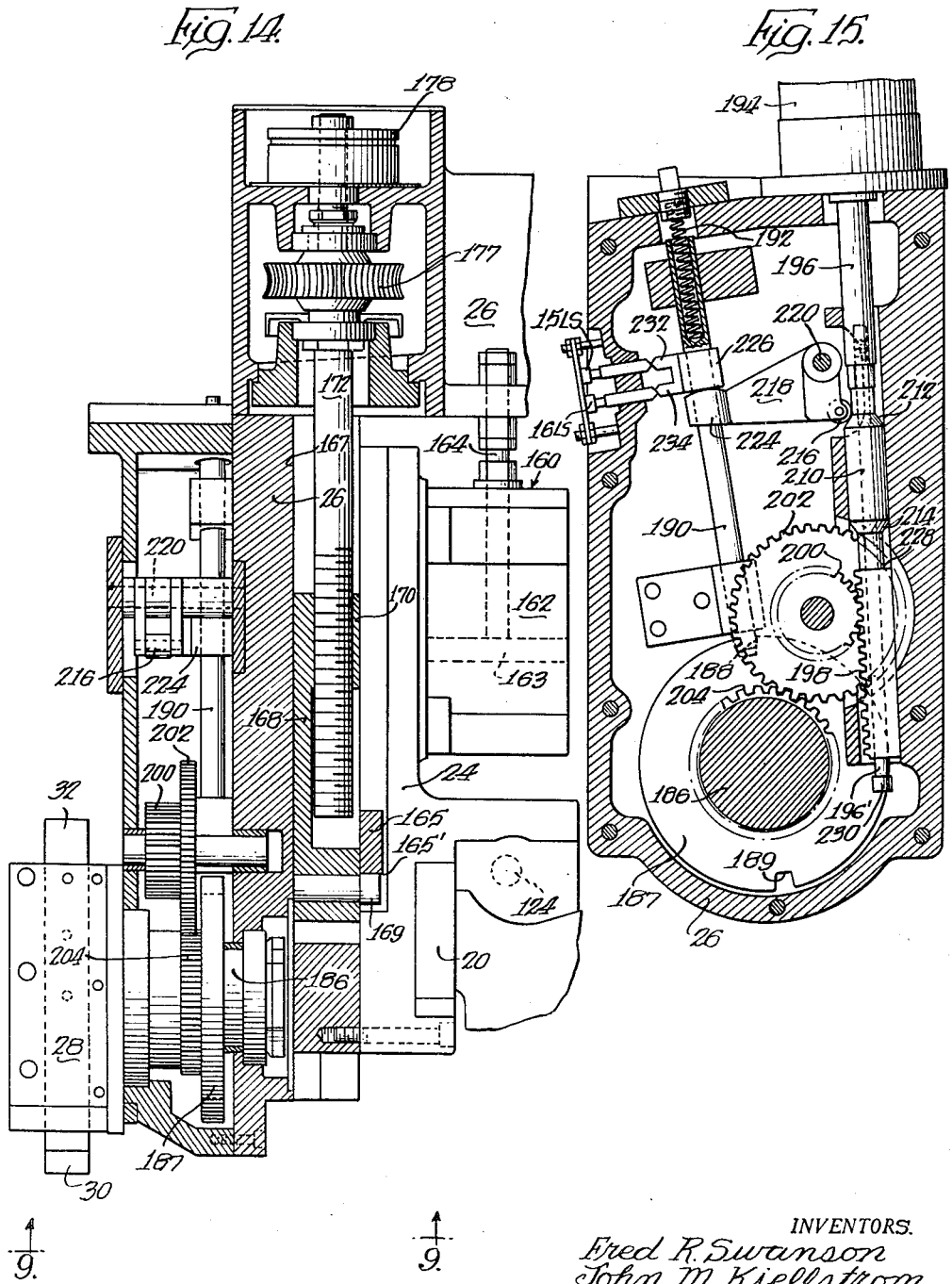

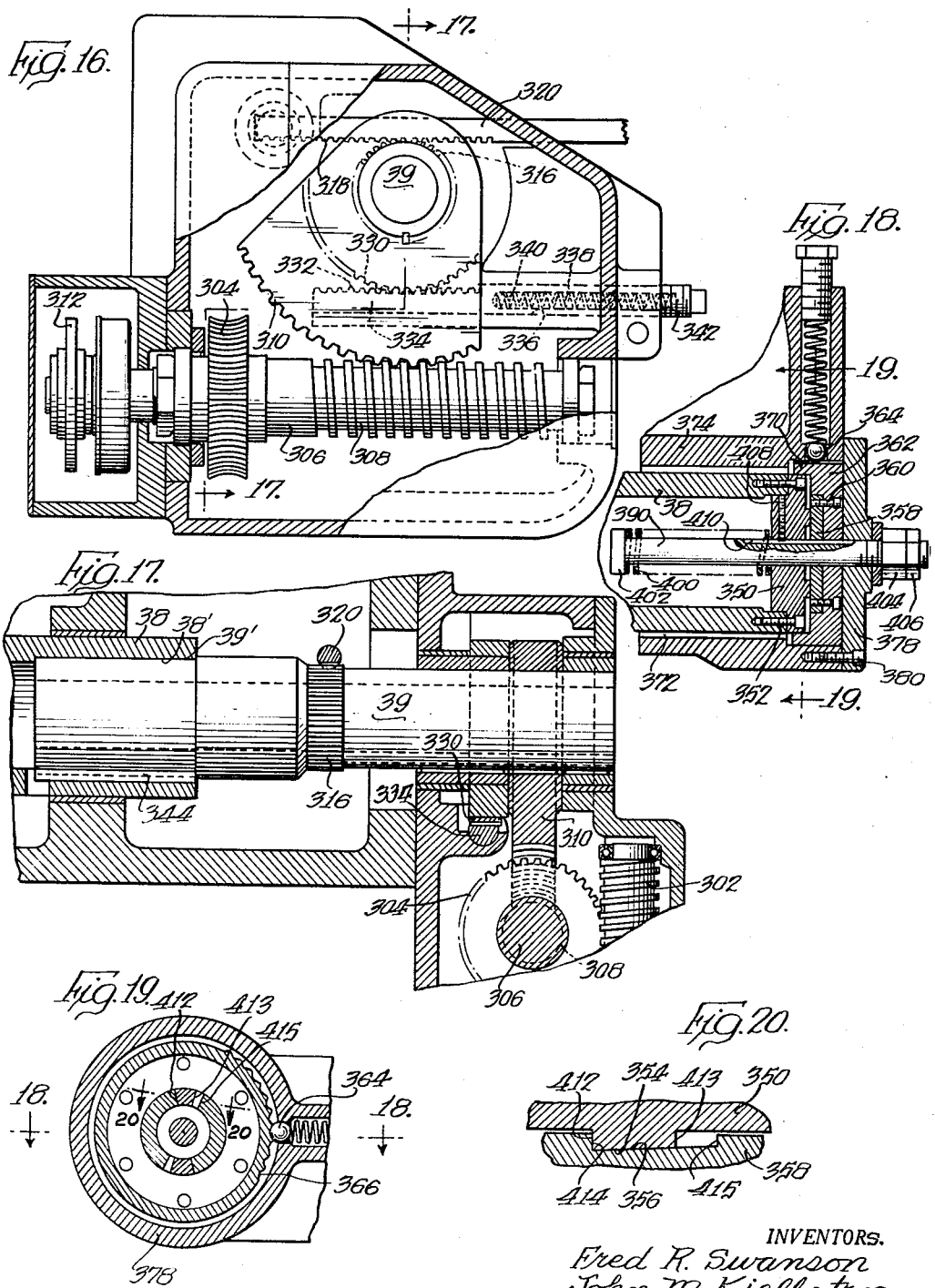

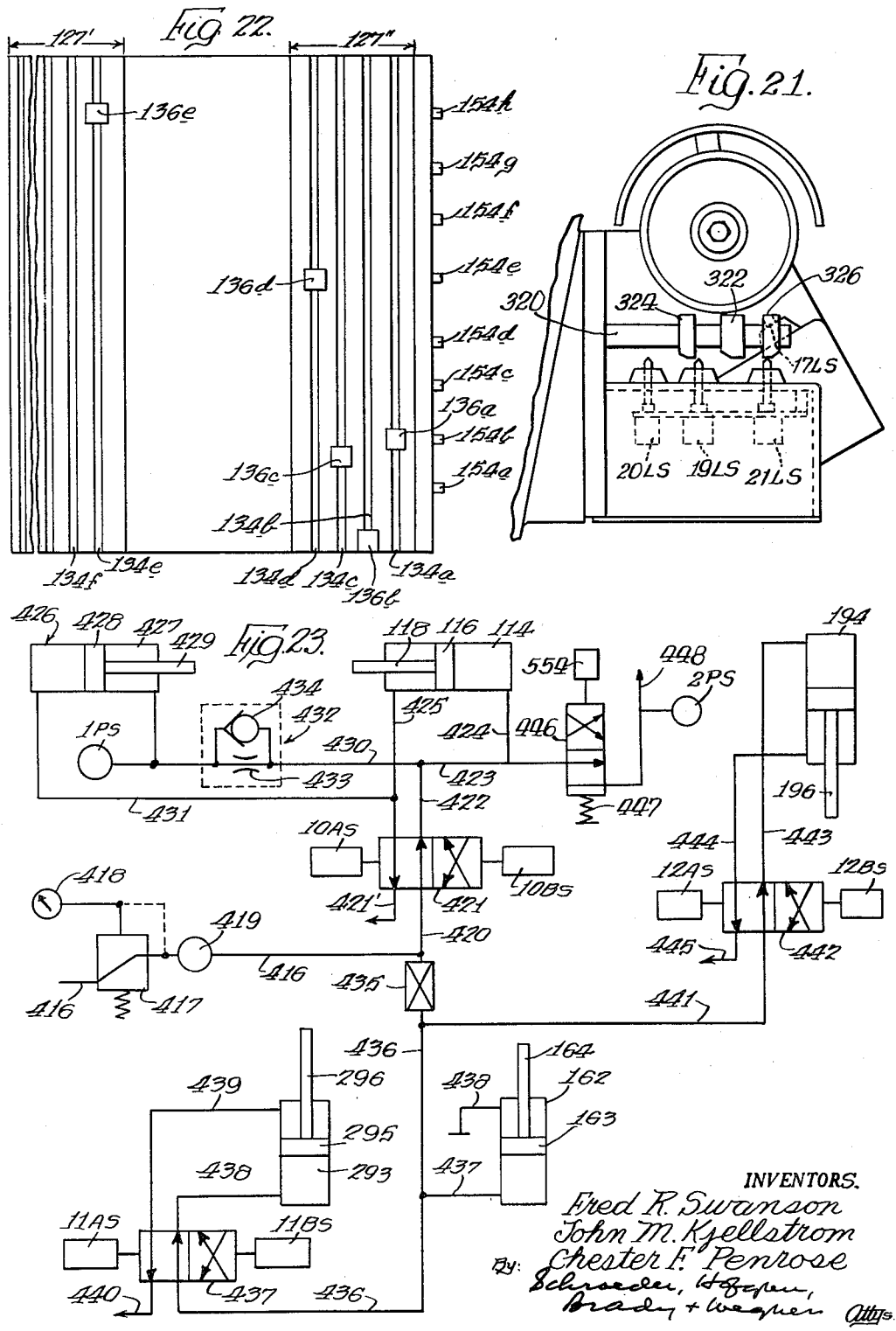

Fig. 24c.

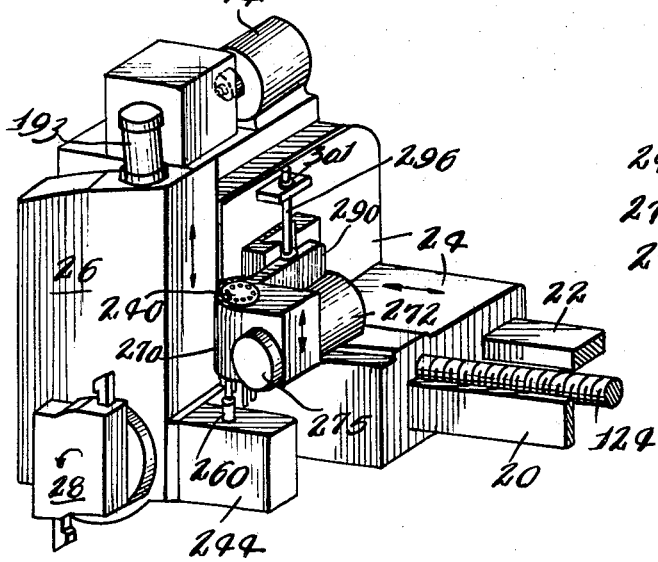
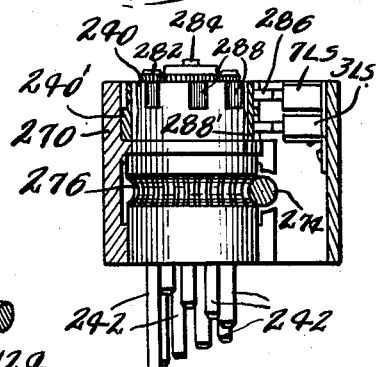
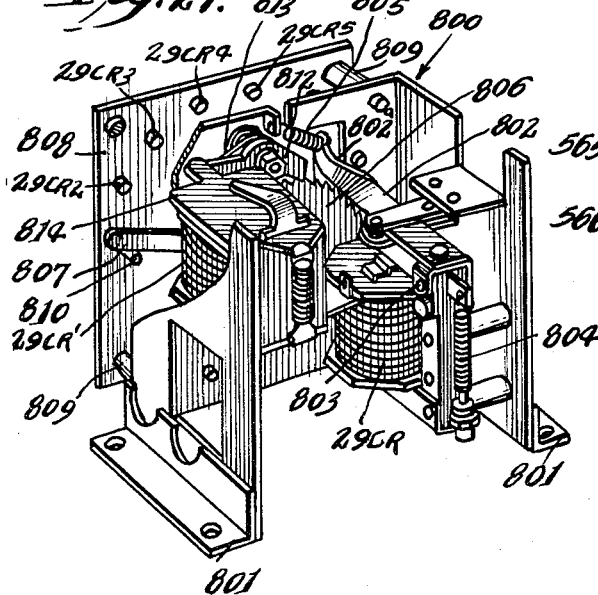
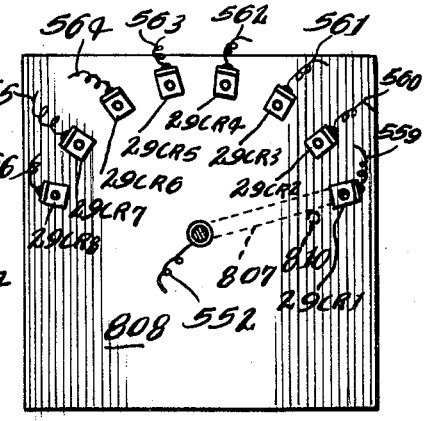

United States Patent Office 2,946,249
Patented July 26, 1960

2,946,249
STEP-TURNING LATHES
Fred R. Swanson, John M. Kjellstrom, and Chester F. Penrose, Rockford, Ill., assignor to Sundstrand Corporation, a corporation of Illinois Filed July 13, 1955, Ser. No. 521,830
16 Claims. (Cl. 82—11)

This invention relates to improvements in machine tools and more particularly to improvements in step-turning lathes.

It is an object of the invention to provide a new and improved step-turning lathe having a rotary work supporting spindle, a carriage reciprocable on the lathe bed longitudinally of the spindle axis, a tool slide reciprocable on the carriage transversely of the spindle axis, and novel means for controlling the movements of the carriage and tool slide for turning a series of surfaces of different diameters on a rotating workpiece.

Another object is to provide a new and improved step-turning lathe of the type described in the preceding paragraph having means for automatically controlling the carriage and tool slide to move the tool through a first cutting cycle including movements longitudinally and movements transversely of a rotating workpiece to turn a series of stepped diameters thereon, and then to move the tool through a second, similar, step-turning cycle with the tool in advanced positions nearer the axis of the workpiece.

A further object of the invention is to provide a new and improved step-turning lathe of the type described in the preceding paragraph including rotary control means driven in proportion to the carriage movement, and having dogs for controlling the carriage movement to determine the length of steps cut on the workpiece, a rotatable control drum having an annular series of elements for controling the slide movement transversely on the carriage to determine the diameter of steps cut on the workpiece, means for indexing the control drum while one step is being cut to position a succeeding element for determining the diameter of the succeeding step, and a slide mounting the control drum for adjustment with respect to the spindle axis between cutting cycles to control the slide movement during a second cycle with the tool in an advanced position nearer the axis of the workpiece.

A further object is to provide, in a lathe of the type described in the preceding paragraphs, a work-supporting spindle having a drive which may be selectively controlled to rotate the spindle at different speeds and new and improved means for automatically controlling the drive to rotate the spindle at different speeds during different steps in a cycle.

Another object is to provide, in a lathe of the type described in the preceding paragraphs, a spindle drive having change speed gearing which may be controlled to rotate the spindle at different predetermined speeds and novel means for preselectively controlling the change speed gearing to rotate the spindle at different predetermined speeds during different steps in a cycle and, during each of the steps in one cycle, at a predetermined speed different from the speed during the corresponding step in another cycle, wherein the control means includes, in one series, spindle speed selectors for each of the steps in one cycle, and in another series, spindle speed selectors for each of the steps in another cycle.

A further object is to provide in a lathe of the type described in the preceding paragraphs, a facing tool carried by an arm on a rock shaft and new and improved means for controlling the movement of the facing tool toward and away from the rotating workpiece, including a separate reversible motor for driving the rock shaft and control members driven in proportion to the rock shaft movement for controlling the reversible driving motor.

Other objects and advantages will become apparent from the following detailed description taken in connection with the accompanying drawings, in which:

Fig. 1 is a plan view of the lathe;
Fig. 2 is a front elevation of the lathe;
Fig. 3 is an enlarged, fragmentary, elevational view taken from the left end of the lathe as viewed in Fig. 2, and showing a switchbox mounted on the carriage;
Fig. 4 is an elevational view of the left end of the lathe as viewed in Fig. 2, the carriage and tool slide being omitted;
Fig. 5 is an elevational view of the right end of the lathe as viewed in Fig. 2;
Fig. 6 is an enlarged fragmentary right end elevation showing the carriage control mechanism;
Fig. 7 is a sectional view taken on the line 7—7 of Fig. 6;
Fig. 8 is an enlarged fragmentary sectional view taken on the line 8—8 of Fig. 4 showing the variable speed drive for the spindle;
Fig. 9 is a fragmentary bottom view taken at about the line 9—9 of Figs. 2 and 14 showing the bottom end of the tool slide;
Fig. 10 is an enlarged fragmentary elevational view, partly in section and partly broken away, taken on the line 10—10 of Fig. 1, and showing the control mechanism for the tool slide movements;
Fig. 11 is an enlarged fragmentary plan view showing the mounting for the slide control mechanism, and with parts broken away to show the drive for the control mechanism;
Fig. 12 is a perspective view of sleeve forming a part of the control drum for controlling the slide movement;
Fig. 13 is a front elevational view of the switch-box shown in Fig. 10 with the cover removed for clarity;
Fig. 14 is a sectional view taken on the line 14—14 of Fig. 9 showing the actuating mechanism for the tool slide and the indexing mechanism for the tool turret;
Fig. 15 is a sectional view view taken on the line 15—15 of Fig. 9 showing the indexing mechanism for the tool turret;
Fig. 16 is an enlarged fragmentary elevational view, partly broken away, of the left end of the lathe showing the drive for the facing tool rock shaft;
Fig. 17 is a fragmentary sectional view taken on the line 17—17 of Fig. 16 showing the drive for the facing tool rock shaft;
Fig. 18 is an enlarged fragmentary sectional view taken on the line 18—18 of Figs. 5 and 19 showing the mounting of the facing tool rock shaft at the tailstock end;
Fig. 19 is a fragmentary sectional view taken on the line 19—19 of Fig. 18 showing the facing tool relief cams;
Fig. 20 is an enlarged fragmentary sectional view taken on the line 20—20 of Fig. 19 showing the facing tool relief cams;
Fig. 21 is an enlarged, fragmentary end elevational view taken from the left end of the lathe as viewed in Fig. 2, and showing the control mechanism for controlling the facing tool drive;

Fig. 22 is a plan development of the periphery of the control drum and control disc for controlling the carriage drive;

Fig. 23 is a schematic diagram of the air circuits connected to the various piston and cylinder devices;

Fig. 24b is a continuation from the bottom of the wiring diagram shown in Fig. 24a;

Fig. 24d is a continuation from the top, right hand side of the wiring diagram shown in Fig. 24a;

Fig. 25 is a perspective view including the carriage, cross slide, tool turret, and indexable control drum of the lathe illustrated in preceding figures;

Fig. 26 is a sectional view taken on the line 26—26 of Fig. 11;

Fig. 27 is a perspective view illustrating a ratchet relay included in the circuits illustrated; and Fig. 28 is a rear elevational view of the relay shown in Fig. 27.

Figure 24A:
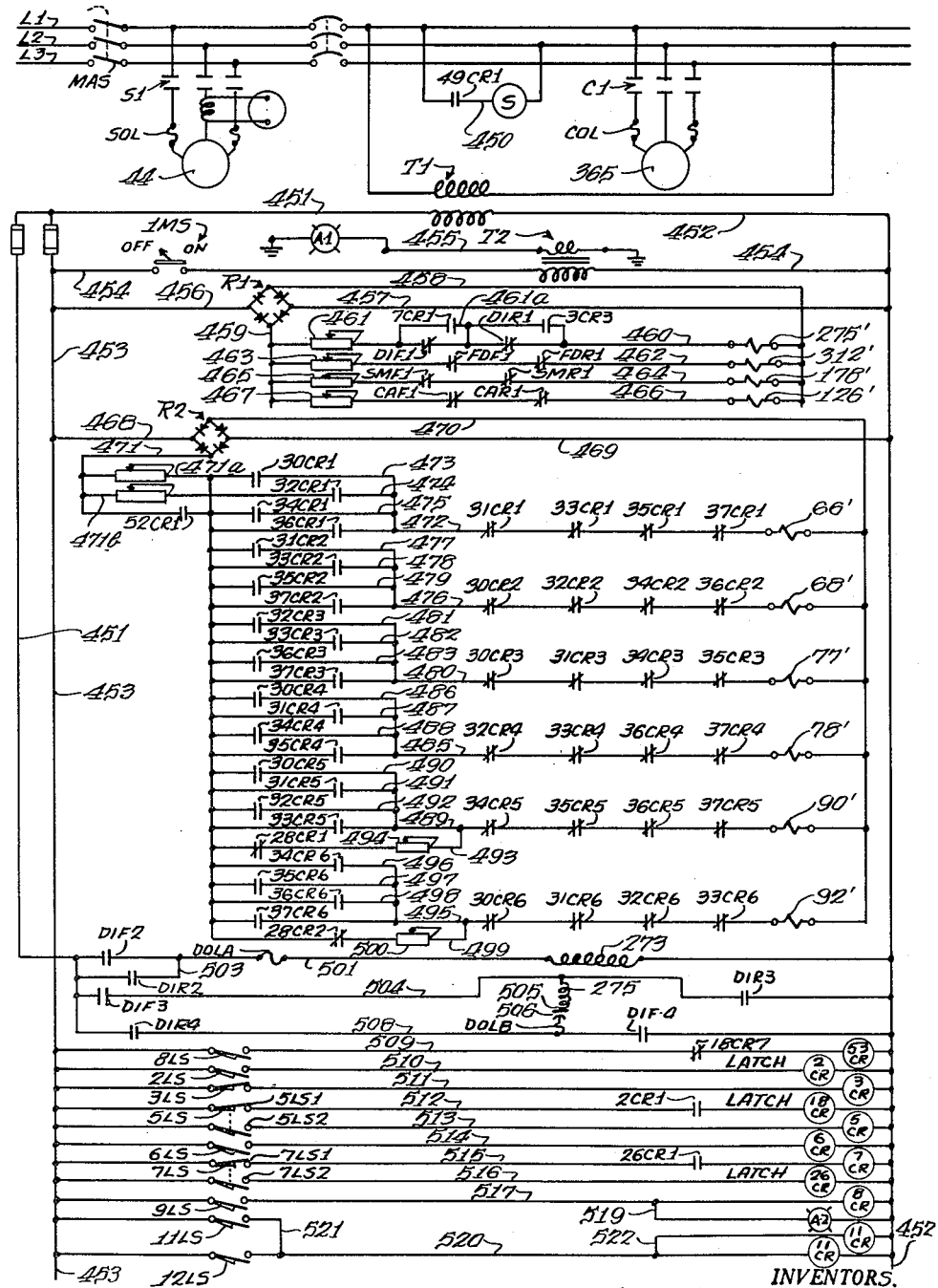
Fig. 24a is a portion of the wiring diagram illustrating the electrical circuits.

The invention further resides in the combination, construction and arrangement of parts illustrated in the accompanying drawings and while we have shown therein a preferred embodiment, we wish it understood that the same is susceptible of modification and change within the scope of the appended claims.

The lathe in general

Referring now to the drawings, in a preferred embodiment, the lathe includes a base 10 which supports a headstock 12, a tailstock 14 and a bed 16. The headstock supports a rotary work supporting spindle 18 which is driven through a variable speed drive which may be selectively controlled to rotate the spindle at any of a plurality of different predetermined speeds. The tailstock 14 supports a center 40 which is actuated by means of a piston and cylinder device for movement toward the headstock to position a workpiece for rotation with the spindle. The bed 16 is arranged in back of the spindle 18 and the tailstock 14 and includes guide ways 20 and 22 above the spindle axis and extending longitudinally thereof for supporting a reciprocably mounted carriage 24. The carriage supports a tool slide 26 which is mounted on the front of the carriage over the axis of the spindle 18 for movement vertically toward and away from the spindle axis. A tool turret 28, pivotally mounted on the slide 26 near its lower end, carries roughing and finishing tools 30 and 32, respectively. A facing tool 34 is carried by an arm 36 secured to a rock shaft 38, which is mounted in the frame below and in back of the axis of the spindle 18. It is apparent that with this arrangement, the spindle 18 is readily accessible for loading and unloading of the workpieces and that both the facing tool and the step-turning tool may be easily observed by an attendant to readily detect irregularities in operation.

As described in greater detail hereinafter, the carriage 24, the tool slide 26 and the tool turret 28 are automatically controlled to move through successive step-turning cycles to turn a series of stepped diameters on a rotating workpiece, wherein each cycle includes intermittent movement of the carriage 24 longitudinally of the spindle axis through a cutting stroke and, between the intermittent movements of the carriage, movement of the tool slide 26 transversely of the spindle axis to dispose the cutting tool in successive stepped positions. In a succeeding work cycle, the carriage is moved through a longer cutting stroke with the tool slide 26 in advanced positions nearer the spindle axis so as to remove a second layer of material from the workpiece. In another succeeding cycle, the finishing tool 32, which projects farther from the turret 28 than the roughing tool 30, is indexed to a work engaging position to remove still another layer of material from the workpiece. The facing tool 34 may be actuated at some suitable time during such a multiple-cycle operation. The lathe is capable of producing a workpiece having up to eight steps of different diameters. It is desirable to maintain an optimum surface feed of the work, regardless of the diameter of step being turned on the workpiece. Thus, the variable speed drive for the spindle 18 is automatically controlled and may rotate the spindle at a different speed for each of the steps during one cycle and at another group of speeds during another cycle.

The spindle drive

Referring to Fig. 4, the spindle 18 is driven by a motor 44 connected by a belt 45 and pulley 46 to a shaft 48. The drive is transmitted from shaft 48 through shafts 64 and 88 to the spindle shaft 102. Referring to Fig. 8, the variable speed drive for the spindle includes two change speed gear units 50 and 52 on the shaft 64 and one change speed gear unit 54 on the shaft 88. The change speed gear units 50, 52 and 54 are connected in series to drive the spindle and each of the units includes a pair of gears of different size arranged in parallel for alternative connection in the drive chain by electromagnetic clutches.

Gears 56 and 58 are secured to the shaft 48 and are arranged to mesh with gears 60 and 62, respectively, which are rotatable on shaft 64, in the change speed gear unit 50. Clutches 66 and 68 in the unit 50 are arranged to connect the gears 60 and 62, respectively, to the shaft 64. Each of the clutches comprises an annular rim 70, secured to the gear with which it is associated, and spaced annular rings 72 extending inwardly from the rim 70 for cooperation with spaced discs 74 secured to the shaft 64. In the clutch 66, a coil 66', shown in the wiring diagram (Figs. 24a), is energized to magnetically couple the members 72 and 74 to clutch the gear 60 controlled thereby to the shaft 64. A coil 68', shown in the wiring diagram, controls the clutch 68.

The change speed gear unit 52 includes gears 80 and 82, which are rotatable on the shaft 64, and clutches 77 and 78, respectively, controlled by coils 77' and 78', respectively, for connecting the gears to the shaft. Gears 80 and 82 mesh with gears 84 and 86, respectively, which are secured to shaft 88. The change speed gear unit 54 includes gears 94 and 96, rotatable on shaft 88, and clutches 90 and 92, respectively, controlled by coils 90' and 92', respectively, for connecting the gears to the shaft. Gears 94 and 96 mesh with gears 98 and 100, respectively, which are secured to the spindle shaft 102.

In order to drive the spindle, one of the clutches in each of the change speed gear units 50, 52 and 54 is energized to complete the gearing from the motor 44 to the spindle shaft 102. It will be appreciated that the clutches in the three units may be energized in various combinations to drive the spindle at any of eight predetermined speeds. As illustrated, the speed at which the spindle may be driven varies from 250 r.p.m., when the clutches 66, 78 and 90 are energized, to 1450 r.p.m., when the clutches 68, 77 and 92 are energized. After all clutches are de-energized to interrupt the drive to the spindle, both clutches 90 and 92 in the unit 54 may be energized to brake the spindle.

Figure 24C:
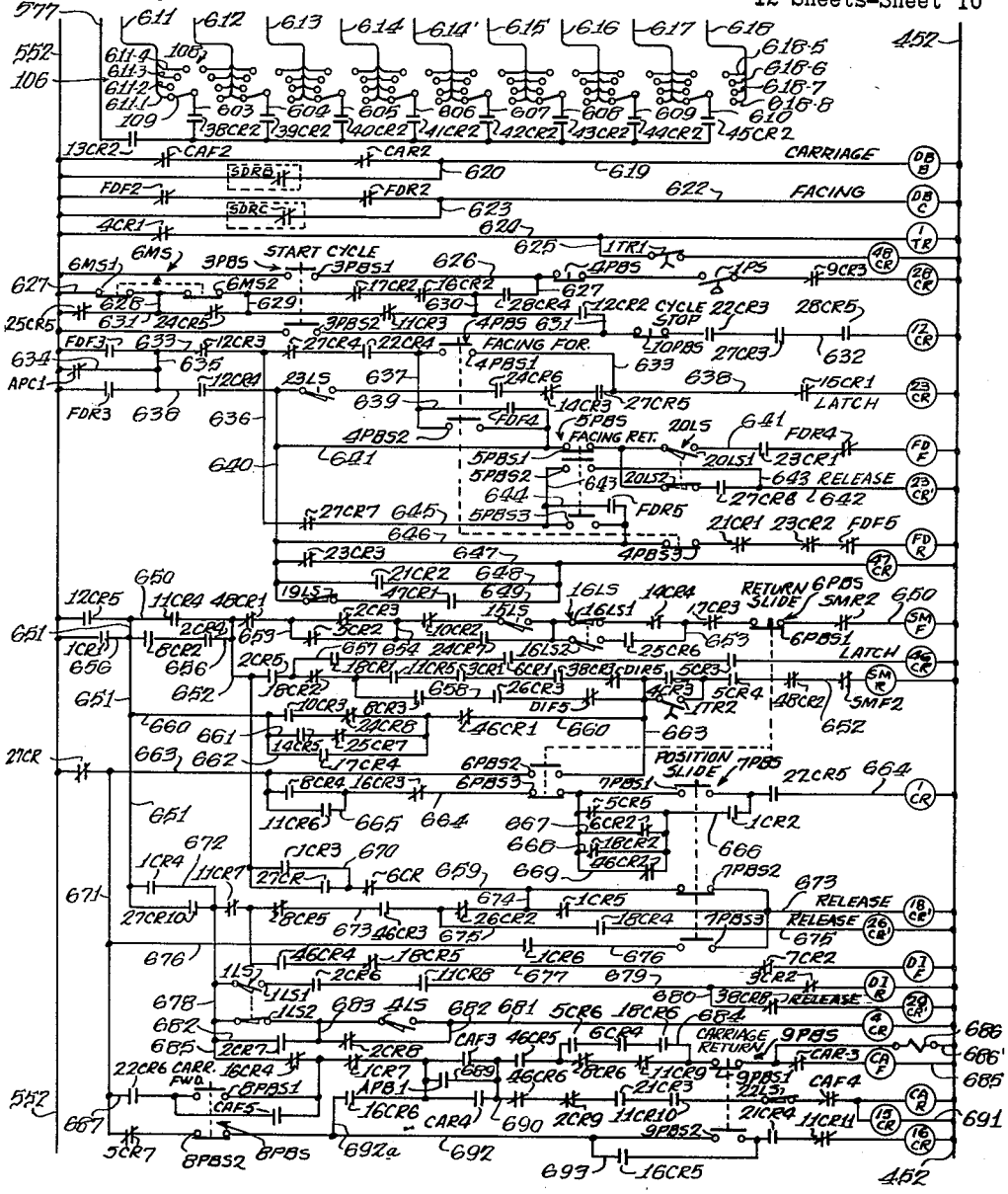
Fig. 24c is a continuation from the bottom of the wiring diagram shown in Fig. 24b.

According to the invention, means is provided to preselect any of the eight predetermined speeds for each of the steps in a cycle and to preselect a different group of speeds for another cycle. Referring to Fig. 2, this means includes two groups 104 and 106 of spindle speed selectors 108. Each of the groups 104 and 106 includes eight selectors 108, numbered 1 through 8, corresponding to the eight steps which may be cut on a workpiece. Referring to Figs. 24b and 24c, each of the selectors 108 includes an annular series of eight stationary contacts, numbered 1 through 8, corresponding to the eight spindle speeds from lowest to highest, and a manually settable contact 109 for selectively making a circuit through one of the eight stationary contacts to energize the clutches in the variable speed units in one of the combinations permitted. Thus, any speed may be preselected by any of the selectors 108. As described more in detail in describing the wiring diagram, means is provided for automatically shifting control of the clutches from one selector 108 to the next as the successive steps in a work cycle occur and means is provided for shifting control of the clutches from group 104 to group 106 at the beginning of the second work cycle.

Referring to Figs. 4 and 8, a pulley 110, secured on the end of the spindle shaft 102, is connected by a belt 111 to drive a pulley 112 secured on the shaft of a speed switch 113 (Fig. 4), connected in the electrical circuit (see Fig. 24b, wire 567). The speed switch 113 is a conventional device having normally open contacts adapted to close on rotation of the shaft driven by pulley 112 when the spindle attains the lowest selective speed of 250 r.p.m. and to open when the spindle speed drops below 250 r.p.m. The switch is utilized to interrupt other operations in the lathe in the event that the spindle speed falls below 250 r.p.m. due, for example, to clutch failure.

The tailstock

The tailstock 14 is mounted for adjustment on ways 110 (Fig. 5) extending longitudinally of the spindle axis on the base 10. The piston and cylinder device for actuating the tailstock center 40 includes a cylinder 114 (Fig. 2), mounted on the tailstock, and a piston 116 having a rod 118 connected to extend the center 40 toward the headstock to position a workpiece for rotation with the spindle. Fluid under pressure may be admitted to opposite ends of the cylinder 114 for actuating the center 40 to move toward and away from the headstock.

The carriage

Referring now to Figs. 1 and 5, the carriage 24 is driven by a reversible D.C. electric motor 120, which is connected by bevel gearing 122 to a carriage feed screw 124 connected in a conventional manner to drive the carriage. The carriage motor 120 is connected in a circuit (Fig. 24d) to be braked electrodynamically and the feed screw 124 is braked by an electromagnetically operated brake 126 controlled by a coil 126' shown in the wiring diagram (Fig. 24a). The combined braking effects insure that the carriage is stopped at the desired position, without overrun, each time it is operated.

In order to control the carriage movement to determine the length of steps cut on a workpiece in each cutting stroke, and in order to determine the length of the cutting strokes in successive work cycles, a mechanism driven in proportion to the carriage movement controls the carriage motor 120. Referring to Figs. 6, 7 and 22, this control mechanism includes a dog drum 127 comprised of axially-spaced drum sections 127' and 127" secured on a shaft 128 connected by worm gearing 129 to be driven by a shaft 130. As shown in Fig. 5, the shaft 130 is connected by bevel gearing 131 to a shaft 132 which is driven by the carriage feed screw shaft 124 through bevel gearing 133, Fig. 8.

The drum sections 127' and 127" are provided with axially-spaced circumferential slots 134 in which control dogs 136 may be adjustably mounted for actuating switches in the electrical control circuit. As the machine is illustrated, dogs 136a, 136b, 136c, 136d and 136e are provided in the slots 134a, 134b, 134c, 134d and 134e, respectively. Dogs 136a, 136c, 136d and 136e actuate limit switches 10LS, 23LS, 14LS and 17LS, respectively, in a switchbox 137 and the dog 136b actuates limit switches 11LS and 12LS simultaneously. As explained in detail in describing the wiring diagram, the switches 11LS and 12LS are actuated to stop the carriage at the end of each return stroke and to initiate adjustments in preparation for the succeeding cycles; the switches 10LS, 14LS and 17LS, respectively, are actuated at the end of succeeding cutting strokes of the carriage to withdraw the tool slide and reverse the carriage, and the dogs actuating these switches may be adjusted to provide successive cutting strokes of different length which, as illustrated, are of successively greater length. The switch 23LS is actuated to initiate movement of the facing tool 34 at a suitable time in one of the cycles.

Referring now to Figs. 6 and 7, the control mechanism also includes a dog disc 150 secured to the end of the drum section 127". The disc 150 is provided with a plurality of dogs 154 for controlling the intermittent movements of the carriage during each cutting stroke to determine the length of the steps cut on the workpiece. As illustrated, dog 154a is permanently secured to the disc and dogs 154b to 154h are adjustably secured in a slot 152 in the face of the disc, and each of the dogs in succession actuates limit switches 8LS and 9LS almost simultaneously, to stop the carriage movement, change the spindle speed and start the tool slide movement outwardly. The dog 154a engages the switches 8LS and 9LS at the end of the first step cut in each cycle. As the disc 150 rotates in proportion to the carriage movement, the dog 154b determines the length of the second step cut, the dog 154c the length of the third step, and so on.

As shown in Fig. 6, the switches 8LS and 9LS are actuated by a lever 155 pivoted at 156 and biased upwardly by a spring 157. The member 155 is pivoted against the urge of the spring 157 by a plunger 158 which is engaged and depressed by the dogs 154. Switches 11LS and 12LS, which are controlled by the dog 136b on the drum 127, are simultaneously actuated by similar means. The switches 10LS, 23LS, 14LS, 17LS and 18LS, which are controlled by dogs on the drum 127, are each actuated directly by means of a plunger 158' associated with each switch and engaged by one of the dogs provided on the control drum.

In order to control the maximum limit to which the carriage may be returned, a safety switch 22LS, seen in Fig. 1, is mounted on the base structure in the path of the rear corner of the carriage and is adapted to be actuated by the carriage to break the circuit to the carriage drive motor in the event that the switches 11LS and 12LS fail to do so.

The tool slide

The tool slide 26 is mounted on a slideway 159 (Fig. 9) on the front of the carriage above the spindle axis for movement in a vertical direction toward and away from the spindle axis. Referring to Fig. 14 the slide is continually biased upwardly away from the spindle axis by a fluid motor 160 including a cylinder 162 secured to the carriage 24 and a piston 163 having a rod 164 secured to the slide 26. Movement of the slide away from the spindle axis is limited by a bar 165 anchored to the bed of the lathe and having a guide surface 165' extending longitudinally of the spindle axis. The slide is formed with a cavity 167 extending transversely of the spindle axis, which slidably receives a member 168 having a roller 169 adapted to engage the cam bar 165 to limit slide movement and to roll along the surface 165' as the carriage is moved longitudinally thereof. The bar 165 may have a surface 165' which is parallel to the spindle axis or a surface which is tapered or of irregular configuration, depending on whether it is desired to produce a workpiece in which the steps are of constant diameter or of tapered or irregular configuration.

The member 168 is adjustable in the cavity 167 with respect to the slide 26, transversely of the spindle axis, and for this purpose, is provided with a lug 170 having a threaded bore which receives a screw shaft 172 rotatably mounted on the slide, but held against axial movement. Referring to Fig. 1, the shaft 172 is driven by a reversible D.C. electric motor 174 mounted on the slide and having a worm 176 driving a worm gear 177 (Fig. 14) secured to the shaft 172. Any adjustment of the member 168 by the motor 174 will effect a corresponding adjustment of the slide 26 with respect to the spindle axis under control of the urge of the fluid motor 160.

The motor 174 is controlled to adjust the tool slide 26 to determine the diameter of successive steps turned on a rotating workpiece supported by the spindle 18. The motor 174 is connected in a circuit (Fig. 24d) to be electrodynamically braked each time it is de-energized after operating the screw shaft 172, and the shaft 172 is braked by an electromagnetically operated brake 178 controlled by a coil 178' shown in the wiring diagram. The combined braking effect of the two means insures an accurate positioning of the tool slide 26 without overrun, so that the successive stepped diameters turned on a workpiece are nicely controlled.

The slide motor 174 is controlled to adjust the slide 26 on the carriage 24 toward and away from the spindle axis by means of limit switches actuated in response to slide movement. At the beginning of each cycle of operation, it is necessary to move the slide to a minimum diameter position to permit adjustments in preparation for the cycle to follow. Referring particularly to Fig. 3, in order to determine the ultimate limit to which the tool slide may move toward the spindle axis, that is, the minimum diameter position, limit switches 1LS and 2LS are provided in a switchbox 178 on the side of the carriage (see also Figs. 1 and 2) nearest the headstock. The switches are controlled by a lever 179 pivotally mounted at 180 and biased to a normal position by a spring 181. The lever 179 is pivoted to actuate the switches by means of a plunger 182 which is engaged by a dog 183 adjustably secured to the tool slide. The specific function of these switches is described more in detail hereinafter in describing the electrical circuit.

Referring now to Figs. 10, 11, 12, 13, 25 and 26, in order to determine the diameters of the various steps turned on the workpiece, an indexable, barrel-shaped member or drum 240 is mounted on the carriage (through the medium of a vertical slide 290 to be described) to rotate about an upright axis. The drum is provided with an annular series of axially adjustable stop elements 242 adapted to control switches on the slide connected in circuit to control the motor 174. Referring to Fig. 13, a switchbox 244 (also visible in Figs. 2 and 10) mounted on the slide 26 houses switches 4LS, 5LS and 6LS. The switches 4LS and 5LS are connected by bolts 250 and 252, respectively, to one end of a lever 256 pivotally mounted at 258 in the switchbox. The switch 6LS is actuated by a pin 254 on the other end of lever 256. The right end of lever 256 is normally biased downwardly by a spring 257 so that the switches 4LS and 5LS are normally actuated. The other end of lever 256 is thus raised and the switch 6LS is not actuated. The lever 256 is pivoted by a plunger 260, reciprocable vertically in the switchbox 244, and having a pin 264 projecting laterally therefrom to engage a cam surface 256' on the lever 256, when the plunger is depressed. The plunger 260 is biased upwardly by a spring 262 and the pin 264 is guided in a slot 263 in the switchbox to limit movement of the plunger.

On movement of the tool slide 26 upwardly away from the spindle axis the plunger 260 engages one of the stop elements 242 on the drum 240 (Fig. 10), to depress the plunger and pivot the lever 256, thus releasing the switches 4LS and 5LS, and actuating the switch 6LS. When the switches 4LS and 5LS are thus actuated, the slide motor 174 is immediately reversed to move the slide 26 toward the spindle axis. Movement of the slide toward the spindle axis continues only long enough to allow the lever 256 to actuate the switch 5LS again. When this occurs, the slide motor 174 is deenergized and the slide is thus properly positioned. At the same time, the carriage motor 120 is energized, initiating carriage movement to effect the next turning operation on the work. Movement of the slide away from the workpiece is initiated when the switches 8LS and 9LS are actuated by one of the dogs 154 on the disc 150 to deenergize the carriage motor 120 at the end of a step turned on the workpiece.

The indexable control drum 240 is rotatably mounted in a bearing 270 (Figs. 10 and 11) supported on the carriage and is indexed by a reversible A.C. electric motor 272 connected by a worm shaft 274 to a worm gear 276 integral with the drum 240. The motor 272 is energized to index the drum each time carriage feed movement is initiated. Thus, the drum is indexed while one step is being turned on the workpiece so as to present a succeeding element 242 into position for controlling the next withdrawal of the slide 26 and the succeeding stepped diameter on the workpiece. The motor 272 is deenergized to stop the indexing of drum 240 by means of a switch 7LS (Figs. 10, 11 and 26) having its actuating arm 286 (Fig. 11) arranged to engage a series of notches 288 on the periphery of a sleeve 240' (Figs. 11 and 12) tightly fitted on the drum 240. The notches 288 correspond in number to the stop elements 242 and are spaced around the drum 240 in accordance with the spacing of the stop elements. The switch 7LS is actuated to deenergize the indexing motor 272 when the switch arm 286 falls into one of the notches 288. The worm shaft 274 is braked by an electromagnetically operated brake 275, controlled by a coil 275' shown in the wiring diagram.

According to the invention, as many as eight stepped diameters may be turned on a single workpiece. One of the stop elements 242 is required at the beginning of the turning operation for each diameter turned and one additional stop element is required at the end of the last diameter turned to control the withdrawal of the tool slide 26 after the complete cutting stroke of the carriage 24. Thus, the drum 240 is provided with nine equally-spaced stop elements 242, and nine equally-spaced notches 288 for controlling the switch 7LS.

The motor 272 is reversely energized at the beginning of each new cycle of operation to return the control drum 240 to the starting position. This occurs when the limit switch 1LS, previously described, is actuated by the dog 183 on movement of the tool slide to the minimum diameter position. The return operation of the motor 272 is controlled by a switch 3LS (Figs. 10 and 26) mounted beneath the switch 7LS and controlled by a single notch 288' (Fig. 12) on the periphery of the drum sleeve 240'. When an arm on the switch 3LS (similar to arm 286 on switch 7LS) drops into the notch 288' the motor 272 is deenergized, and the drum is thus properly positioned to control a succeeding cycle.

The stop elements 242 are slidably mounted respectively in bores 278 in the drum 240. Each element 242 includes an enlarged end portion 242' slidably keyed in the bore 278, the reduced portion of the element 242 slidably passing through a reduced portion 278' of the bore 278. Each of the elements 242 is provided with a threaded bore 280 which receives a threaded rod 282 rotatably mounted in the bore 278, but held therein against axial movement. By grasping a knob 282' on the rod 282, the stop elements 242 may be adjusted as desired. Once adjusted, the knobs 282' are all locked by means of a cover plate 283, which is held by a screw 284.

The stop elements may be adjusted with the first projecting farthest toward the spindle axis, and with succeeding elements each projecting a shorter distance than the preceding one. In this manner, successively shorter stop elements are indexed into position to control the slide and the steps turned on the work are of increasing diameter toward the headstock. The stop elements 242 may be adjusted with succeeding elements projecting farther toward the spindle axis. For this purpose, the end of each stop element is formed with a bevelled camming portion 242a adapted to engage a bevelled portion 260a formed at the top of the plunger 260. On indexing a longer stop element into position, the bevel 242a rides over the bevel 260a to depress the plunger 260. Thus, the steps formed on the workpiece may be of decreasing diameter toward the headstock by an amount within the range of the bevels 242a and 260a.

The bearing 270 and the motor 272 are supported on a control slide 290 mounted by means of a dovetailed connection 291 (Fig. 11) for limited movement on the carriage toward and away from the spindle axis. With this arrangement, the control unit including the drum 240 may be adjusted between cutting cycles to move the drum 240 nearer to the workpiece in order to control the tool slide in a succeeding cycle with the tool in an advanced position nearer the workpiece to remove a second layer of material.

In order to adjust the control slide 290, it is provided with a cylindrical bore 292 (Fig. 10) closed at opposite end by plugs 293 and 294. The cylindrical bore 293 houses a piston 295 adjustably connected to the carriage 24 by means of a piston rod 296 secured by lock nuts 301 and passing through the plug 293. It is obvious that the slide 290 may be adjusted back and forth on the carriage 24 by admission of fluid to the bore 292 on the opposite sides of the piston 295. Movement of the slide 290 toward the spindle axis is limited by means of an abutment member 297 on the slide 290 which engages a stop 298 on the carriage 24. Movement of the slide 290 away from the spindle axis is limited by engagement of the plug 294 with an extension 295' on the piston 295. Movement of the slide 290 toward the spindle axis is initiated after the tool slide is moved to a minimum diameter position at the beginning of the second cycle of an automatic multiple cycle operation. The second cycle is initiated in response to actuation of the limit switches 11LS and 12LS at the end of the return stroke of the carriage in the first cycle. A switch 13LS (Fig. 10) mounted on the carriage 24 for actuation by a dog 299 on the slide 290 when the slide is advanced toward the spindle axis is connected in circuit to shift control of the spindle drive to the second group 106 of spindle speed selectors.

*The tool turret*

Referring now to Figs. 14 and 15, the tool turret 28 is secured on a shaft 186 pivotally mounted on the slide. The roughing tool 30 and the finishing tool 32 are arranged substantially at diametrically opposite positions on the turret and the turret may be indexed to present either tool to a work-engaging position. An index plate 187, secured to the shaft 186, is provided with recesses 188 and 189 at diametrically opposite positions corresponding to the spacing of the tools. These recesses are adapted to receive a detent plunger 190, which is biased by a spring 192 to force the plunger into one or the other of the recesses 188 and to securely maintain the turret in the position to which it has been indexed.

The turret is indexed by a fluid motor including a cylinder 194 and piston rod 196 connected by a rack 198 to drive a gear 200 having integral therewith a gear 202 in mesh with a pinion 204 on the turret pivot shaft 186. Fluid under pressure may be admitted to opposite ends of the cylinder 194 to move the rack 198 in opposite directions to index the turret.

In order to withdraw the detent plunger 190 to permit indexing of the turret, the piston rod 196 is provided with an enlarged portion 210 having cam surfaces 212 and 214 at opposite ends thereof. The cam surfaces 212 and 214 are arranged to engage a roller 216 mounted on an arm 218 pivoted at 220 and having a bifurcated end 224 embracing the plunger 190 and engaging a collar 226 secured thereon.

In order to permit withdrawal of the plunger 190 before the turret is indexed, the rack 198 is slidably mounted on a reduced end portion 196' of the piston rod 196 in a manner to provide a lost motion connection therewith. The rack 198 is free to slide on the reduced end portion 196' between a shoulder 228 formed by the reduced end portion and a nut 230 secured to the end of the reduced end portion.

As the machine is illustrated, the turret is positioned to present the roughing tool 30 to a work position during the first two cutting cycles of a multiple-cut operation, and after the second cycle is completed, the fluid motor 193 is actuated to index the turret to present the finishing tool 32 to a work position for the third and final cut. Since the finishing tool 32 projects further from the turret than the roughing tool 30, this indexing permits the removal of a third layer of material in the third cycle without further adjustment in the machine.

Switches 15LS and 16LS (Fig. 15) are supported on the slide 26 for actuation by dogs 232 and 234, respectively, projecting from the collar 226 secured on the plunger 190. The recess 188 on the plate 187 is employed to detent the turret when the roughing tool 30 is presented to a work position and this recess is of such a size that the plunger 190 is not permitted to move fully into the recess. When the plunger is in this position, the dog 232 actuates the switch 15LS. The function of this switch will become apparent in describing the wiring diagram. The recess 189, however, is larger than the recess 188 and when the turret is indexed to present the finishing tool to work engaging position the plunger 190 moves completely into the recess and the dog 234 advances to actuate the switch 16LS, which initiates the third cycle as described more in detail in connection with a description of the wiring diagram.

*The facing tool*

Referring to Figs. 2 and 5, the facing tool 34 is carried by a tool holder 35 secured to the arm 36 adjustably fixed on the rock shaft 38. The rock shaft 38 is journalled at one end in the base 10 adjacent the tailstock, and is supported at the other end by means in the headstock 12. The rock shaft 38 is driven at the headstock end by a reversible D.C. electric motor 300 (Fig. 2) which drives a worm 302 (Fig. 17) in mesh with worm gear 304 (Figs. 16 and 17). The worm gear 304 is secured to a shaft 306 having a worm 308 thereon in mesh with a worm gear segment 310 connected to the rock shaft 38. The rock shaft 38 is a hollow tubular member and at the headstock end is provided with a slightly enlarged internal diameter 38' which receives the reduced end portion 39' of a stub shaft 39 journalled in the headstock. The shaft 38 is tightly fitted on the shaft 39 and keyed thereto at 344, and the worm gear segment 310 is keyed on the stub shaft 39.

Movement of the facing tool toward the work is regulated by a mechanism including a gear segment 330 keyed on the stub shaft 39 adjacent the worm gear segment 310 and meshing with a rack gear 332 on a rod 334 reciprocably mounted in a bore 336. On movement of the facing tool toward the work, the rod 334 is moved against the bias of a spring 338, seated in a recess 340 in the rod 334 and bearing against a plug 342 which closes the bore 336. This mechanism prevents an overthrow of the facing tool at the end of the feed stroke when the motor 300 is reversed. The motor 300 is connected in a circuit to be electrodynamically braked each time it is stopped and the worm shaft 306 is provided with an electromagnetically operated brake 312 which is controlled by a coil 312' connected in circuit to be energized simultaneously with deenergization of the motor 300. The combined braking effects of the brake 312 and the motor 300 provide for an accurate positioning of the facing tool.

As previously described, movement of the facing tool is initiated when the switch 23LS is actuated by the dog 136c on the dog drum 127. Referring to Figs. 16 and 21, movement of the facing tool, once initiated, is thereafter controlled by a reciprocable dog bar 320 driven in proportion to the rock shaft movement. For this purpose, the stub shaft 39 is provided with an integral pinion 316 in mesh with a rack 318 on the dog bar 320. Dogs 322, 324 and 326, Fig. 21, are secured to the end of the bar 320 which projects outwardly over the switchbox 137 secured to the front of the headstock. Dogs 322, 324 and 326 actuate switches 19LS, 20LS and 21LS respectively. When the facing tool is in a normal or withdrawn position, the dog 326 actuates the switch 21LS. Actuation of the switch 23LS initiates movement of the facing tool at a rapid approach speed. As the dog bar 320 is driven in proportion to the movement of the facing tool, the dog 322 is advanced to actuate the limit switch 19LS which slows the movement of the facing tool to a feed or cutting speed. On further movement of the dog bar 320, the dog 324 actuates the switch 20LS which reverses the facing tool drive motor 300 to return the facing tool at a rapid rate. As the dog bar returns to its original position, the dog 326 actuates the limit switch 21LS to stop the motor 300.

In order to provide tool relief for the facing tool at the beginning of its return stroke, the rock shaft 38 and the stub shaft 39 are mounted for axial movement. This axial movement of the shaft 38, as it begins a return stroke, will withdraw the facing tool from the face of the workpiece to provide tool clearance and avoid marring the work. The axial movement need only be a slight one, and the gear 316 may slide on the rack 320, while the shaft 39 may move slightly relative to the gear segments 310 and 330. At the tailstock end of the tubular rock shaft 38 (Fig. 18), a circular plate 350 is secured to the shaft by bolts 352. The face of the plate 350 is provided with projecting cam surfaces 354 (Fig. 20) adapted to cooperate with recessed cam surfaces 356 on the face of a circular plate 358 which is secured by bolts 360 to a plate 362. The plate 362 is rotatably mounted, but is restrained by frictional engagement with a cover plate 378 and by a spring pressed ball 364 engaging notches 366 on the periphery of the plate 362, to rotate only when a positive drive is applied to the plate 358.

The plate 350 secured to the end of the shaft 38 is rotatably received within a rim portion 370 projecting axially from the plate 362, while the shaft 38 is journalled in hardened bearings 372 supported in a bracket 374 extending from the base 10 of the lathe. The bearing bracket 374 is closed by a plate 378 secured by bolts 380 to the bracket. A large bolt 390 having a threaded end portion is rotatably received in registered openings in the plates 378 and 362. A spring 400, bearing between the head 402 of the bolt 390 and the plate 350, urges the tubular shaft 38 and the cam surfaces 354 to the right in Fig. 18, into engagement with the cam surfaces 356 on the plate 358. Adjustment and lock nuts 404 and 406, respectively, are provided on the bolt 390 to regulate the pressure of spring 400. A pin 408 passing radially through plate 350 is received in a key slot 410 in the bolt 390 so that the two are keyed together for rotation.

Referring to Figs. 19 and 20, cam surface 354 terminates in external shoulders 412 and 413 and cam surface 356 terminates in internal shoulders 414 and 415. Thus, if the facing tool rock shaft 38 is rotated clockwise to move the tool toward the work, the plate 358 being restrained against rotation, the cam surface 354 will move relative to the cam surface 356, thus forcing the shaft 38 to move axially toward the headstock. When the shoulder 413 engages the shoulder 415, the plate 358 will thereafter be rotated with the plate 350. When the shaft 38 is rotated counterclockwise to withdraw the facing tool from the work, the cam surface 354 will move relative to the cam surface 356 until the shoulder 412 engages the shoulder 414. This relative movement permits a slight axial movement of shaft 38 away from the headstock under the urge of spring 400 to withdraw the facing tool from the face of the workpiece. Continued rotation of the plate 350 will return the plate 358.

*Air pressure system*

Each of the piston and cylinder devices previously described for actuating the various parts on the lathe are connected in an air system for supplying air under pressure to the cylinders. Referring to Fig. 23, air under pressure is supplied from a suitable source through a line 416 having a pressure regulator 417 and a pressure gauge 418 connected therein. An oil-air mist lubricator 419 is also connected in the line 416 and supplies droplets of oil which are atomized and conveyed to the various reciprocating parts for lubrication.

Air under pressure is supplied to the tail stock cylinder 114 from the line 416 through a line 420 and a 4-way, 2-position valve 421 controlled by solenoids 10AS and 10BS. Lines 422, 423 and 424 connect the valve 421 to the right end of the cylinder 114, as viewed in Fig. 23, and a line 425 connects the valve 421 with the left end of the cylinder 114. A line 421' connects the valve 421 to exhaust. The solenoid 10BS is energized to position the valve to connect the lines 420 and 425 to admit air under pressure to the left end of the cylinder 114, and to connect the lines 422 and 421' to place the right end of the cylinder in communication with exhaust. Energization of the solenoids 10AS and 10BS is controlled by a manually settable switch described hereinafter in connection with a description of the wiring diagram.

A piston and cylinder device 426, not otherwise described, is also connected to be supplied with air under pressure from the valve 421. The device 426 includes a cylinder 427 and a piston 428 having a rod 429 connected to actuate a work holding chuck, not otherwise described, which may be provided on the work supporting spindle. Air under pressure is supplied to the right end of the cylinder 427 from the line 422 through a line 430; air is supplied to the left end of the cylinder 427 from the line 425 through a line 431. A speed regulator 432 connected in the line 430 includes a restrictor valve 433 and a by-pass ball check valve 434. When air under pressure is admitted to the line 430, the ball check valve 434 is closed, forcing the air through the restrictor valve 433, thus regulating the speed of movement of the piston 428 to close the chuck slowly. A pressure switch 1PS connected in the line 430 includes contacts shown in the wiring diagram (wire 626, Fig. 24c) adapted to close when the tail stock center is advanced and the chuck is closed to indicate that the work piece is clamped.

Air under pressure is admitted to the lower end of the cylinder 162 for biasing the tool slide upwardly against the cam bar 165 from the line 416 through a manually controlled valve 435, a line 436 and a line 437. Thus the tool slide is always biased upwardly whenever air under pressure is supplied in the line 416 and the valve 435 is open. A line 438 connects the upper end of the cylinder 162 to atmosphere at all times.

Air under pressure is supplied to the cylinder 293 for actuating the control slide 290 from the line 436 through a 4-way, 2-position valve 437 controlled by solenoids 11AS and 11BS. A line 438 connects the valve 437 to the lower end of the cylinder 293; a line 439 connects the valve to the upper end of the cylinder. A line 440 connects the valve to exhaust. The solenoid 11AS is energized to position the valve to connect the lines 436 and 438 and to connect the lines 439 and 440. The solenoid 11BS is energized to position the valve to connect the lines 436 and 439 and to connect the lines 438 and 440. The solenoid 11AS is normally energized so that air under pressure is supplied to the lower end of the cylinder 293 to normally maintain the control slide 290 in a raised position. In automatic operation of the lathe, the solenoid 11BS is energized at the end of the return stroke of the carriage to admit fluid to the upper end of the cylinder 293 and shift the control slide downwardly, nearer the axis of the work piece to maintain the tool slide in an advanced position during the second cycle of operation.

Air under pressure is supplied to the cylinder 194 for indexing the tool turrent from the line 436 through a line 441 and a 4-way, 2-position valve 442 controlled by solenoids 12AS and 12BS. Lines 443 and 444 connect the valve 442 to the upper and lower ends of the cylinder 194, respectively. A line 445 connects the valve to exhaust. The solenoid 12AS is energized to position the valve to connect lines 441 and 443 and to connect the lines 444 and 445. The solenoid 12BS is energized to position the valve to connect the lines 441 and 444 and to connect the lines 443 and 445. The solenoid 12AS is normally energized to admit fluid to the upper end of the cylinder 194, thus maintaining the tool turrent in a position in which the roughing tool is presented to work engaging position. In automatic operation, the solenoid 12BS is energized at the end of the return stroke of the carriage in the second cycle to admit fluid to the lower end of the cylinder 194, thus indexing the turret to present the finishing tool to a work engaging position during the third cycle of operation.

Oil-air mist lubrication is supplied to the interior of the spindle head for lubricating the entire spindle drive through a 1-way, two-position valve 446 connected to the line 423. The valve 446 is biased to a closed position by means of a spring 447 and is opened by means of a solenoid 554 to connect the line 423 to a line 448 which delivers the mist to the spindle head. A pressure switch 2PS is connected in the line 448 and includes contacts shown in the wiring (wire 551, Fig. 24b) adapted to close when pressure builds up in the line 448 to indicate that the spindle drive is being lubricated.

*The electrical circuit*

The electrical circuit shown in Figs. 24a, 24b, 24c and 24d is of the "across the line" type for purposes of simplicity. The circuit includes a number of electromagnetically operated relays and switch contacts controlled thereby. Coils for operating the relays are represented by circles having a designation for the coil placed inside the circle. See, for example, the coil S in wire 450 (Fig. 24a). Switch contacts controlled by a particular coil bear the same designation as the coil, followed by the numbers 1, 2, etc. For example, contacts S1 in circuit with spindle motor 44 (Fig. 24a) are controlled by relay coil S. Short spaced parallel lines represent normally open relay controlled switch contacts. See, for example, contacts S1. Short spaced parallel lines with a diagonal therethrough represent normally closed relay controlled switch contacts. See, for example, contacts DIF2 in wire 460 (Fig. 24a). The manner in which the contacts are controlled by relay coils is described hereinafter in describing the different types of relays utilized.

Referring to Figure 24a, the spindle motor 44 is connected to a source of supply indicated by the lines L1, L2, and L3, through normally open contacts S1 and through an overload relay winding SOL. A master switch MAS in the lines L1, L2, and L3 controls the supply of power to the entire circuit. The normally open contacts S1 in the circuit to the spindle motor 44 are controlled by a relay coil S in a wire 450 connected across the lines L1 and L2. Normally open contacts 49CR1 in wire 450 are controlled by a relay coil 49CR (described hereinafter) in wire 551. On energizing the coil S when the contacts 49CR1 are closed, the contacts S1 are closed to complete a circuit to the spindle motor 44. The overload relay winding SOL controls normally closed contacts SOL1 in wire 551 so that in response to an overload current in the motor 44, the contacts SOL1 will be opened to deenergize the coil 49CR, open the contacts 49CR1, deenergize the coil S, and open the contacts S1. The relay coil S also controls normally open contacts S2 in wire 558 which supplies control circuits, thus requiring that the contacts S2 be closed in order to provide for operation of the lathe.

Lines L1 and L2 are connected to the primary of a transformer T1, and wires 451 and 452 are connected to the secondary of the transformer. Wires 453 and 468, leading from the wire 451, and wire 469, leading from the wire 452, are connected to supply a rectifier R2 having wires 470 and 471 leading therefrom to provide a D.C. circuit for supplying the clutch coils 66', 68', 77', 78', 90', and 92' which control the clutches, previously described, in the spindle drive.

A chip conveyor motor 365, not otherwise described, is connected to the source of supply indicated by the lines L1, L2, and L3, through normally open contacts C1 and through an overload relay winding COL. The contacts C1 are controlled by a relay coil C in wire 542, Figure 24b, which may be energized by closing a switch 3MS in wire 542. On energization of the coil C, the contacts C1 are closed to energize the chip conveyor motor 365. The overload relay winding COL controls normally closed contacts COL1 in wire 551, so that in response to an overload current in the chip conveyor motor, the contacts COL1 are opened to break the circuit to the relay coil 49CR.

Referring to Figure 24b, the windings 10AS' and 10BS' of solenoids 10AS and 10BS for controlling the admission of fluid to the tailstock cylinder 114 for advancing and retracting the tailstock center 40, are connected across the wires 452 and 453 in wires 547 and 550, respectively. Energization of the windings 10AS' and 10BS' is controlled by a relay having coils 9CR and 9CR' in wires 546 and 545, respectively (Fig. 24b). The coils 9CR control normally closed contacts 9CR1 in wire 547 in circuit with solenoid winding 10AS' and normally open contacts 9CR2 in wire 550 in circuit with solenoid winding 10BS'.

Figure 24D:
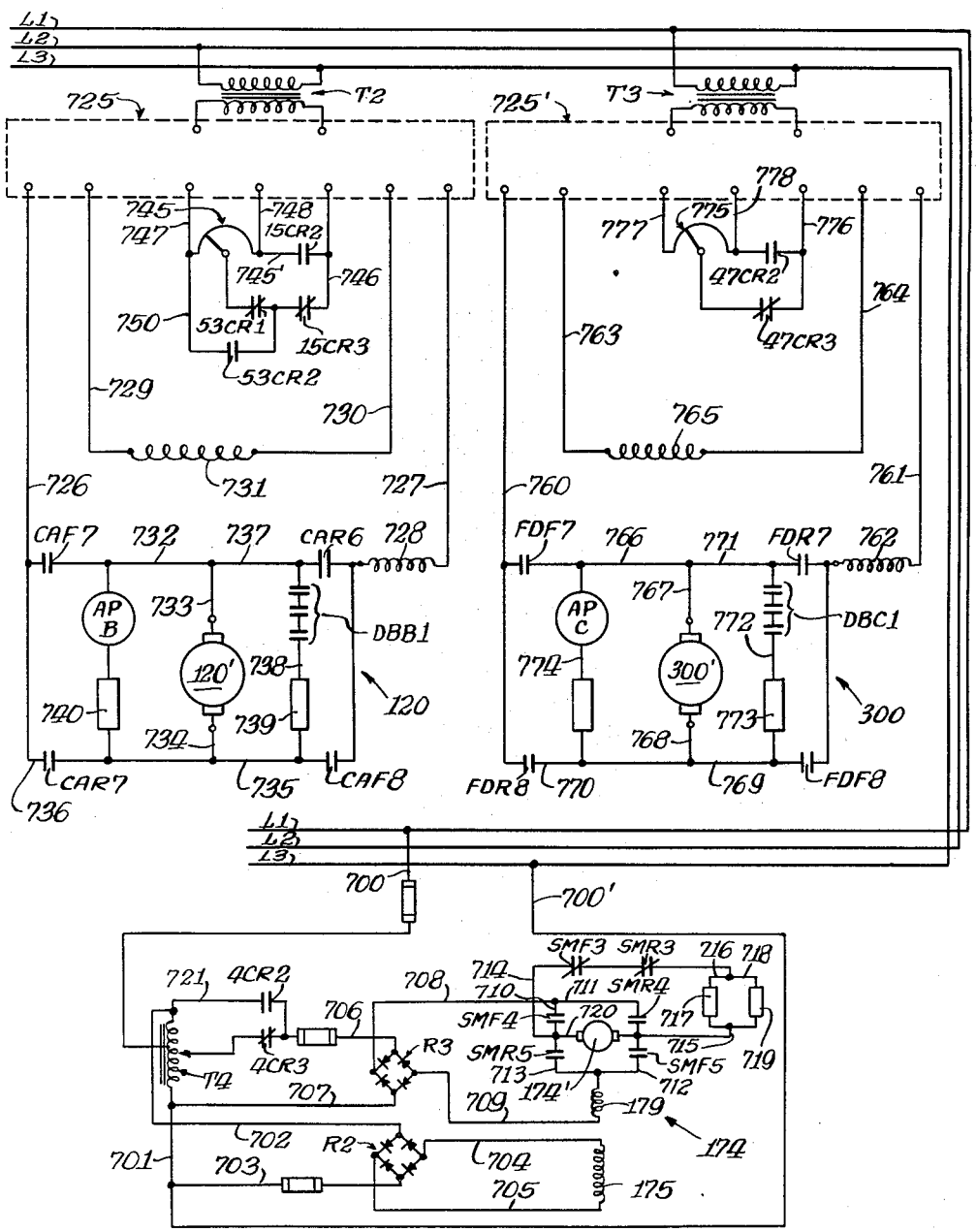

Referring to Fig. 24d, the D.C. carriage drive motor 120 is supplied from a transformer T2, having its primary connected across the lines L2 and L3, and having its secondary connected to an electronic full wave rectifier unit 725, which may be of conventional manufacture, adapted to provide a variable armature voltage to the motor 120 for controlling the speed of the motor to drive the carriage at a relatively slow feed rate and at a rapid return rate. Wires 726 and 727, leading from terminals on the control unit are connected in circuit with the armature 120' and the series field 728 of the motor 120. Wires 729 and 730, leading from terminals on the control unit 725, are connected to provide a constant voltage supply for the shunt field 731 of the motor 120. The rectifier unit output voltage to the motor armature 120' is controlled by a variable reference voltage supplied by a voltage divider including a variable resistor 745.

In order to provide for reversing the motor 120, the armature 120' is connected to be supplied alternatively through parallel reversing circuits, the first of which includes a wire 732 connected to the wire 726, a wire 733 connected to the wire 732 and to the armature 120', a wire 734 leading from the armature, and a wire 735 connected between the wire 734 and the series field 728. The wires 732 and 735 include normally open contacts CAF7 and CAF8, respectively, which are closed on energization of a coil CAF in wire 685 to energize the motor forwardly. The second circuit includes a wire 736 connected between the wires 726 and 734, the wire 734, the armature, the wire 733 and a wire 737 connected between the wire 733 and the series field 728. Normally open contacts CAR6 and CAR7, in wires 737 and 736, respectively, are closed on energization of a coil CAR in wire 690 to energize the motor reversely.

In order to dynamically brake the motor 120, a wire 738 is connected across the wires 735 and 737 and includes normally open contacts DBB1 and a dynamic braking resistor 739. The contacts DBB1 are controlled by a coil DBB in wire 619 which is energized to close the contacts when both the coils CAF and CAR are deenergized, closing the contacts CAF2 and CAR2 in wire 619. Thus on deenergizing the motor 120, the contacts DBB1 are closed, and voltage induced in the armature coils on continued rotation of the armature, produces a current in the dynamic braking circuit. The resultant power is dissipated in the resistor 739, producing a dynamic braking effect, and slowing the armature to a stop.

Referring to Fig. 24a, the coil 126' for controlling the electromagnetic brake 126 on the carriage feed screw, is connected in a wire 466 and is adapted to be energized when both the coils CAF and CAR are deenergized, closing the contacts CAF1 and CAR1 in wire 466.

A control circuit is provided to control the output of the control unit 725 (Fig. 24d) to supply a low voltage to the carriage motor armature circuit when the motor is energized forwardly and to provide an increased voltage to the armature when the motor is energized reversely. Referring to Fig. 24d, this control circuit includes a variable resistor 745 in circuit with the control unit 725 and forming part of a voltage divider adapted to supply a variable reference voltage to the control unit 725 which then controls the carriage feed motor 120 to drive the carriage at a relatively slow forward or feed rate and at a rapid return rate. The voltage divider includes wires 747 and 748 which connect opposite ends of the resistor 745 to terminals on the control unit 725. A wire 746 leads from the movable contact of the resistor 745 to a terminal on the control unit 725 and includes normally closed contacts 53CR1 and 15CR3. A wire 745' is connected between the wires 748 and 746 and includes normally open contacts 15CR2. The contacts 15CR2 and 15CR3 are controlled by a normally deenergized coil 15CR in wire 691 (Fig. 24c) in parallel with the coil CAR in 690. The contacts 53CR1 are controlled by a normally deenergized coil 53CR in wire 509 (Fig. 24a). Thus, on energizing the carriage motor 120 forwardly to effect feed movement of the carriage, the voltage divider provides a relatively low reference voltage across wires 747 and 746 through a circuit including the normally closed contacts 53CR1 and 15CR3 in wire 746, and the carriage is moved at the feed rate. And, on energizing the coil CAR in wire 690 to energize the carriage motor 120 reversely, the coil 15CR in wire 691 is also energized, opening the contacts 15CR3 and closing the contacts 15CR2 in wire 745'. This provides the maximum reference voltage across wires 747 and 746 through a circuit including the contacts 15CR2, and the carriage is driven at a rapid traverse rate during return movement.

The output of the control unit 725 may also be controlled to supply a reduced voltage to the armature circuit of the motor 120 just before stopping the carriage feed at the end of each step turned on a workpiece, so that the motor will be slowed somewhat before cutting the voltage entirely to stop the motor. This control is effected by providing a minimum reference voltage for the control unit 725. To this end, a wire 750 having normally open contacts 53CR2 is connected to wire 747 and to wire 746 between contacts 53CR1 and 15CR3. The contacts 53CR2 are controlled by a coil 53CR in wire 509 (Fig. 24a). This coil is in circuit with the normally open switch 8LS which is adapted to be closed by the dogs 154 on the control disc 150 a moment before the switch 9LS is closed to stop the carriage movement at the end of each of the various steps turned on a workpiece. Thus, on energizing the coil 53CR, the contacts 53CR2 are closed and the contacts 53CR1 in wire 746 are opened. This provides a minimum reference voltage across the wires 747 and 746 so that the unit 725 supplies a minimum voltage to the armature circuit for the carriage motor.

This reduction of the armature voltage slows the motor 120 before stopping and enables a high degree of accuracy in controlling the movement of the cutting tool.

Means may be provided for dynamically braking the carriage motor at the time the armature voltage is reduced in order to more quickly bring the carriage down to a minimum constant rate of movement before the motor is completely deenergized and the electromagnetic brake 126 applied to completely stop the carriage movement. For example, a slow down relay may be connected in circuit with the control unit 725 and adapted to respond to the reduction in reference voltage to close contacts connected in parallel around the contacts CAF2 and CAR2 in wire 619 (Fig. 24c) so that when the coil 53CR is energized to reduce the voltage to slow the carriage motor, a circuit will also be completed to the coil DBB in wire 619 to energize the dynamic braking circuit for the carriage motor. Such contacts are indicated by the broken line box showing of contacts SDRB in wire 620.

The control unit 725 includes a time delay relay (not shown) for controlling normally open contacts TDRB (shown in a broken line box) in wire 551 which require that the electronic control unit be warmed up for about a minute before the lathe may be started. Also, an overload relay (not shown) is provided in the control unit for controlling normally closed contacts OLB in wire 551 to open the contacts in the event of an overload current in the control unit.

The D.C. facing tool drive motor 300 is supplied from a transformer T3 (Fig. 24d) having its primary connected across the lines L1 and L3 and its secondary connected to an electronic full wave rectifier unit 725' similar to the unit 725. The unit 725' is adapted to supply a constant shunt voltage and a variable armature voltage to the motor 300 for driving the facing tool at rapid and feed rates. The circuits are almost identical to those provided in the carriage drive unit and it is believed that these will be understood when reference is made thereto in describing the operation.

Referring to Figure 24d, the slide drive motor 174 is supplied by wires 700 and 700' leading from the lines L1 and L3 and connected to supply an adjustable auto transformer T4. Wires 701 and 702 leading from the transformer T4 are connected to a rectifier R2 having wires 704 and 705 leading therefrom to provide a D.C. circuit for the shunt field 175 for the motor 174. In order to supply the armature 174' and the series field 179, for the motor 174, wires 706 and 707 lead from the transformer T4 to a rectifier R3. Normally closed contacts 4CR3 in wire 706 are bypassed by a wire 721 leading from the transformer T4 to the wire 706 and including normally open contacts 4CR2. With this circuit, the rectifier R3 may be supplied through either of the wires 706 or 721, depending upon which of the contacts 4CR2 and 4CR3 are closed, to take either full or reduced voltage from the transformer. Wires 708 and 709 lead from the rectifier R3 to provide a D.C. circuit for the series field 179 and the armature 174'.

In order to provide for reversing the motor 174, the armature 174' is connected to be supplied alternatively through parallel reversing circuits, the first of which includes a wire 710 having normally open contacts SMF4, a wire 720, and a wire 712 having normally open contacts SMF5. The second circuit includes a wire 711 having normally open contacts SMR4, the wire 720, and a wire 713 having normally open contacts SMR5. In order to drive the motor 174 forwardly, the relay coil SMF in wire 650, Figure 24c, is energized to close the contacts SMF4 and SMF5. In order to drive the motor 174 reversely, the coil SMR in wire 652 (Fig. 24c) is energized to close the contacts SMR4 and SMR5.

In order to dynamically brake the motor 174 after each operation, wires 714 and 715 lead from opposite sides of the armature 174' to opposite sides of resistors 717 and 719 which are connected respectively in parallel and wires 716 and 718. The wire 714 includes normally closed contacts SMF3 and SMR3. Thus on deenergizing the motor 174, the contacts SMF4 and SMF5, and the contacts SMR4 and SMR5 are all open, and the contacts SMF3 and SMR3 are both closed to complete a circuit through the armature 174' and the resistors 717 and 719. As the armature continues to rotate, voltage is induced in the armature coils, producing a current in the dynamic braking circuit. The resultant power is dissipated in the low ohmic value, relatively high wattage, dynamic braking resistors 717 and 719, producing a dynamic braking effect, slowing the armature to a stop.

Referring to Figure 24a, the coil 178' for controlling the electromagnetic brake 178 on the slide drive screw 172, is connected in a wire 464 supplied with D.C. voltage through wires 458 and 459 leading from a rectifier R1. The rectifier R1 is supplied through wires 456 and 457, leading from wires 453 and 452, respectively. The wire 464 includes a rheostat 465 and normally closed contacts SMF1 and SMR1, so that when both sets of contacts are closed, the coil 178' is energized.

The reversible A.C. drum indexing motor 272 (Fig. 10) includes an armature coil 273 in a wire 501 (Fig. 24a) connected between the wires 451 and 452. An overload relay DOLA and normally open contacts DIF2 are connected in series in the wire 501. The contacts DIF2 are bypassed by a wire 503 having normally open contacts DIR2, so that the coil 273 may be energized when either of the contacts DIF2 or DIR2 are closed.

The motor 272 includes a field coil 275, in a wire 505 connected between wires 504 and 508, each of which are connected across the wires 451 and 452. A condenser 506 and an overload relay DOLB are connected in series in the wire 505. The overload relays DOLA and DOLB each control normally closed contacts indicated at DOL1 in wire 551, Fig. 24b so that in response to an overload current in the motor 272, the circuit to coil 49CR will be broken.

In order to energize the motor 272 forwardly or reversely, a circuit may be completed to the field coil 275 alternatively through parallel circuits, the first of which includes normally open contacts DIF3 in wire 504, wire 505, and normally open contacts DIF4 in wire 508. The second circuit, utilized to reversely energize the motor 272, is completed through normally open contacts DIR4 in wire 508, wire 505, and normally open contacts DIR3 in wire 504.

The coil 275' for controlling the electromagnetic brake 275 on the drum indexing shaft 274, is connected in a wire 460 leading from the wire 459 (Fig. 24a) to the wire 458 and having a rheostat 461 and normally closed contacts DIF1 and DIR1. Thus, when both the contacts DIF1 and DIR1 are closed, a circuit is completed to the coil 275' to apply the brake 275.

Referring to Figure 24b, the windings 11AS' and 11BS' of solenoids 11AS and 11BS for controlling the admission of fluid to the cylinder 294 for shifting the control slide 290, are connected in wires 569 and 568, respectively, connected between the wires 552 and 452. The wire 569 includes normally closed contacts 24CR4 so that the solenoid winding 11AS' is normally energized to maintain the control slide 290 in a raised position. The wire 568 inculdees normally open contacts 24CR3 which may be closed to energize the solenoid winding 11BS', which, as described hereinabove, is effective to move the control slide 290 nearer the spindle axis to control the succeeding movements of the tool slide in advanced positions nearer the spindle axis.

The windings 12AS' and 12BS' of solenoids 12AS and 12BS for controlling the admission of fluid to the cylinder 194 for indexing the tool turret are connected in wires 570 and 571, respectively, leading from the wire 552 to the wire 452. The wire 570 includes normally closed contacts 25CR3 so that the solenoid winding 12AS' is normally energized to present the roughing tool to a work engaging position. The wire 571 includes normally open contacts 25CR4 which may be closed to energize the solenoid 12BS' in order to index the tool turret to present the finishing tool to a work engaging position.

The winding 554' of solenoid 554 which controls the valve 446, for supplying oil-air mist lubrication to the spindle head, is connected in a wire 553. A solenoid winding 686 in wire 686' controls a valve, not otherwise described, for supplying coolant fluid to the cutting tool at its point of contact with the workpiece.

The control circuit includes a number of relays in which the contacts controlled thereby are not biased to a normal position but are moved to each position by a separate coil. For example, the latch coil 2CR in wire 510 (Fig. 24a) and the release coil 2CR' in wire 525 (Fig. 24b) are associated with the same relay. In this relay, the release coil 2CR', when energized, moves the contacts associated therewith to a normal position, and when the latch coil 2CR is energized, the position of the contacts is reversed. When the latch coil 2CR is deenergized, the switch contacts controlled thereby do not return to the normal position until the release coil 2CR' is energized. Similarly, when the release coil 2CR' is deenergized, the switch contacts remain in the normal position until the latch coil 2CR is energized. The contacts controlled by these coils are designated 2CR1, 2CR2, etc. The circuit also includes latch coils 9CR, 10CR, 14CR, 17CR, 18CR, 23CR, 24CR, 25CR, 26CR, 29CR, 46CR and 51CR, and cooperating release coils, associated respectively with similar relays, and controlling contacts designated in a similar manner.

The circuit also includes a ratchet relay of conventional construction having a coil 29CR (Fig. 24b) in wire 558 which is adapted on successive energizations to successively close one set of normally open contacts 29CR1, 29CR2, etc. through 29CR8, respectively, in wires 559, 560, etc., through 566, leaving the remaining sets of contacts 29CR1, 29CR2, etc. in normally open positions. As set forth more in detail hereinafter in describing the operation of the lathe, the coil 29CR is utilized to shift control of the spindle drive clutches successively from one of the spindle speed selectors 108 (Figs. 24b and 24c) to the next selector 108 to automatically control the speed of the spindle in successive steps in a cycle.

Referring now particularly to Figs. 27 and 28, a suitable ratchet relay of conventional construction includes a generally U-shaped frame 800 having mounting brackets 801 and supporting a latch coil or stepping coil 29CR and a release coil or reset coil 29CR'. A lever 802 pivoted at 803 is biased upwardly by springs 804 and 805 to a retracted position where a pawl end 802a of the lever is disengaged from the teeth of a ratchet wheel 806. The ratchet wheel is rotatably supported on the frame and is arranged to be indexed on energization of the coil 29CR which draws the lever 802 downwardly so that end 802a engages and indexes the ratchet wheel. A movable switch contact in the form of an arm 807 fixed for rotation with the ratchet wheel 806 travels in a path to successively engage switch contacts 29CR1–29CR8 as the coil 29CR is successively energized. The contacts 29CR1–29CR8 are arranged in an arcuate path on a supporting plate 808 secured on the frame 800 by spacers 809. The contacts extend through the plate 808 and include portions to which wires 559—566 may be soldered as illustrated in Fig. 28. Wire 552 may be connected to the movable switch arm.

A spring (not visible) biases the ratchet wheel and switch arm toward a normal starting position which is defined by engagement of the arm 807 with a stop 810, in which position the arm engages contact 29CR1. Each time the coil 29CR is energized the switch arm is indexed one step, from one switch contact to the next, where it is retained by engagement of a dog 812 biased by spring 813 to constantly engage the ratchet wheel 806 and prevent its reverse travel. The dog 812 may be disengaged from the wheel by energization of coil 29CR' which draws a lever 814 down against an end of the dog to disengage the same and permit spring return of wheel to starting position.

The remaining relays employed in the electrical circuit are of a conventional type in which the contacts controlled thereby are biased in one direction to a normal position when the relay coil is deenergized, and are moved to an opposite position when the coil is energized. Due to the large number of contacts which are controlled by the relays having coils 11CR (Fig. 24a) and 27CR (Fig. 24b), double coils are provided in each of these relays. Thus, double coils 11CR are provided in parallel wires 520 and 522 for simultaneous energization; and double coils 27CR are provided in parallel wires 543 and 544 for simultaneous energization.

The specific function of the relay coils and the contacts controlled thereby is described hereinafter in describing the operation of the lathe.

The normally open speed switch 113 which is controlled by rotation of the spindle is connected in a wire 567 (Fig. 24b) in circuit to the relay coil 22CR. The function of this switch is set forth in describing the operation of the lathe.

It is believed that the remaining portions of the electrical circuit can be best described in describing the operation of the lathe.

*Automatic operation*

The lathe, as illustrated herein, may be set up to automatically perform a three-cycle step turning operation to produce a workpiece having up to eight steps of different diameters. The diameter of steps to be turned on the workpiece may vary widely and it may be necessary to remove only a thin layer of material at the largest diameter. Thus, in turning a workpiece having, for example, increasing diameters toward the headstock, it may be necessary to take cuts only on te first few steps during the first or rough cut cycle, and only a few additional steps in the second or semi-finish cycle, while cuts may be taken on all steps in the last or finish cycle only. Thus, the total length of cutting stroke or carriage movement may vary in successive cycles.

In order to set the machine up for the above described operation, dogs 136a, 136d, and 136e (Fig. 22) on the dog drum 127 are adjusted to provide the desired length of cutting strokes in successive cycles. The dogs 154 on the dog disc 150 are adjusted to provide the desired length of steps on the workpiece. The stop elements 242 (Fig. 10) on the indexable control drum 240 are adjusted to provide the desired diameters of steps turned on the workpiece. The dogs 322, 324 and 326 (Fig. 21) on the facing tool dog bar 320 are adjusted to provide the desired depth of facing cut. The spindle speed selectors 108 in each of the groups 104 and 106 are set to provide the desired spindle speeds.

The master switch MAS is closed to provide a power supply for the entire circuit. Next, a manually settable switch 1MS in a wire 454 (Fig. 24a) connected between wires 453 and 452 is manually closed to supply a transformer T2. A lamp A1 mounted on the tool slide and connected by a wire 455 to the output of transformer T2 is thus energized to direct light on the tool in work engaging position.

A manually settable switch 2MS in wire 540 (Fig. 24b) is utilized in manual operation of the lathe and during automatic operation is set by hand with both its contacts 2MS1 and 2MS2 open.

Next, the manually settable switch 3MS (Fig. 24b) in wire 542 is manually closed to energize the relay coil C which then closes its contacts C1 to energize the chip conveyor motor 365.

The "cycle" switch 4MS (Fig. 24b) in wire 543 is manually closed to energize the coils 27CR which remain energized during automatic operation of the lathe.

Now the manually settable switch 6MS (Fig. 24c) in wire 627 is manually set to provide for the desired number of cycles. If only one cycle is desired, that is if it is desired to remove only one layer of material from the workpiece, the switch 6MS is set so that both its contacts 6MS1 and 6MS2 are open. If it is desired to remove two layers of material from the workpiece, the switch is set so that the contacts 6MS1 are open and the contacts 6MS2 are closed. If a three-cycle operation is desired, the switch is set to close both the contacts 6MS1 and 6MS2. In order to completely describe the operation of the lathe, a three-cycle operation is assumed and both the contacts 6MS1 and 6MS2 are closed.

The workpiece is placed in position and a manually settable switch 5MS (Fig. 24b) is manually set to close its contacts 5MS1 in wire 545 and to open its contacts 5MS2 in wire 546. Closure of the contacts 5MS1 in wire 545 completes a circuit to the release coil 9CR' which then effects closure of its contacts 9CR1 in wire 547 to energize the solenoid 10AS to advance the tailstock center and clamp the workpiece for rotation with the spindle. At the end of the automatic multiple cycle operation, the switch 5MS is manually adjusted to close its contacts 5MS2 to wire 546 to energize the latch coil 9CR which then closes its contacts 9CR2 in wire 550 to energize the solenoid 10BS to retract the tailstock center and release the workpiece.

In order to start the spindle motor 44, a "start" push button switch 1PBS in wire 551 (Fig. 24b) is momentarily depressed to complete a circuit to the solenoid 554 which opens the valve 446 (Fig. 23) to supply oil-air mist lubrication to the spindle head. This effects closure of the pressure switch 2PS in wire 551 to energize the relay coil 49CR. Energization of the coil 49CR effects closure of its contacts 49CR1 in wire 450 (Fig. 24a) to energize the relay coil S. Energization of the coil S is effective to close the contacts S1 in circuit to the spindle motor 44 to energize this motor. Energization of the coil S also closes its contacts S2 in wire 558 (Fig. 24b) in order to provide a power supply for control circuits which control the automatic operation. Energization of the coil 49CR also closes its contacts 49CR2 in wire 557 to complete a holding circuit to the coil 49CR around the switch 1PBS when it is released. In order to stop the spindle at any time when it is rotating, a push button switch 2PBS in wire 551 may be momentarily depressed to break the circuit to the coil 49CR.

Each multiple cycle cutting operation is begun with the carriage at the limit of its return stroke, that is, near the tailstock end of the lathe and with the tool slide 26 withdrawn upwardly away from the spindle axis to a maximum limit. The control drum 240 is in the position to which it was last indexed in the cycle before. The control slide 290 (Fig. 11) is in its withdrawn position upwardly away from the spindle axis and the tool turret 28 is in a position to present the roughing tool 30 to a work engaging position.

The first steps include the return of the control drum to a starting position and positioning of the tool slide to turn the first step on the workpiece. These are accomplished in the following manner.

In order to initiate the automatic multi-cycle operation of the lathe, the "cycle start" push button switch 3PBS is depressed, closing its contacts 3PBS1 in wire 626 (Fig. 24c) and closing its contacts 3PBS2 in wire 632. On closing the contacts 3PBS1, a circuit is completed through the wire 626 to energize the coil 28CR. The pressure switch 1PS in wire 626 was previously closed when air under pressure was admitted to the tailstock cylinder to clamp the workpiece. On energizing the coil 28CR, the contacts 28CR4 in wire 627 are closed to complete a holding circuit around the contacts 3PBS1 so that the coil 28CR will remain energized when the push button switch is released.

On depressing the switch 3PBS to energize the coil 28CR, as described above, the switch is held down long enough to complete a circuit through the contacts 3PBS2 in wire 632 to energize the coil 12CR, in the following manner. The contacts 28CR5 in wire 632 are closed on energizing the coil 28CR as described above, and the contacts 27CR3 in wire 632 are closed when the coils 27CR are energized on closing the switch 4MS in wire 543, as previously described. One of the ratchet relay contacts 29CR1, 29CR2, etc. (wire 559, Fig. 24b), which control energization of the spindle drive clutches is always closed; thus on energizing the coil 28CR, the contacts 28CR3 in wire 576 are closed, and the spindle clutches are energized through circuits described later to start the spindle. When the spindle attains a speed of 250 r.p.m., the speed switch 113 in wire 567 is closed, energizing the coil 22CR and closing the contacts 22CR3 in wire 632 to complete the circuit to coil 12CR. On energizing the coil 12CR, the contacts 12CR2 in wire 631 are closed to complete a holding circuit so that the coil will remain energized when the contacts 3PBS2 are opened on releasing the push button switch 3PBS.

Energization of the coil 12CR effects closure of the contacts 12CR5 in wire 650 (Fig. 24c) to complete a circuit through this wire to energize the coil SMF, all contacts in the wire 650 being closed at this time. Energization of the coil SMF effects closure of its contacts SMF4 in wire 710, Figure 24d, and its contacts SMF5 in wire 712 to energize the slide drive motor 174 forwardly to advance the slide toward the spindle axis. At this time the contacts 1LS2 in wire 681 (Fig. 24c) and the contacts 2CR8 in wire 682 are closed, energizing the coil 4CR. The contacts 4CR2 in wire 721 (Fig. 24d) are closed and the rectifier R3 is supplied from the transformer T4 through these contacts to provide full voltage from the transformer to advance the slide at a rapid rate.

At this time, the control drum 240 has not been returned to its original starting position. Instead it remains in the last position to which it was indexed in the previous cycle, and does not control the first movement of the slide 26 in advancing toward the spindle axis. Instead, on energizing the motor 174, the tool slide moves to a minimum diameter position as controlled by limit switches 1LS and 2LS (Fig. 3) mounted on the side of the carriage 24 and actuated by a dog 183 adjustably secured to the tool slide.

The switch 1LS is actuated a moment before the switch 2LS is actuated. On actuating the switch 1LS, the contacts 1LS2 in wire 681 (Fig. 24c) are opened, deenergizing the coil 4CR, opening the contacts 4CR2 in wire 721 (Fig. 24d) and closing the contacts 4CR3 in wire 706. This supplies a reduced voltage to the motor 174, slowing the slide down to a reduced speed before stoppage.

On deenergizing the coil 4CR, the contacts 4CR1 in wire 624 (Fig. 24c) are closed, energizing the coil 1TR and the coil 48CR. On energizing the coil 48CR, the contacts 48CR1 in wire 650 are opened, deenergizing the coil SMF, thus opening the contacts SMF4 in wire 710 and SMF5 in wire 712 to deenergize the slide drive motor 174. A short time after the coil 1TR is energized, the contacts 1TR1 in wire 625 are opened, deenergizing the coil 48CR and closing the contacts 48CR1 in wire 650. But, when the limit switch 2LS is actuated, its contacts in wire 510 (Fig. 24a) are closed to complete a circuit to energize the latch coil 2CR, thus opening the contacts 2CR3 in wire 650 in circuit to the coil SMF. At this time, the plunger 260 in the switchbox 244 (Fig. 13) is clear of the stop elements on the control drum 240, and the spring 257 pivots the lever 256 to actuate the switch 5LS. Thus the contacts 5LS2 in wire 513 (Fig. 24a) are closed, energizing the coil 5CR and opening the contacts 5CR2 in wire 653 (Fig. 24c) in parallel with the contacts 2CR3.

On deenergizing the coil SMF, its contacts SMF3 in wire (Fig. 24d) are closed so that a circuit is completed through the dynamic braking resistors 717 and 719 to dynamically brake the motor 174. At the same time, the contacts SMF1 in wire 464 (Fig. 24a) are also closed so that a circuit is completed through the wire 464 to energize the brake coil 178' in order to apply the brake 178 on the slide drive screw shaft.

On actuating the limit switch 1LS, its contacts 1LS1 in wire 679 (Fig. 24c) are closed; the contacts 2CR6 in wire 679 are closed on energizing the coil 2CR as described above; since the carriage is at the limit of its return movement, the switches 11LS and 12LS are closed, energizing the coil 11CR in wire 520 (Fig. 24a), and the contacts 11CR8 in wire 679 (Fig. 24c) are closed; and, since the control drum 240 is not at its starting position, the switch 3LS in wire 511 (Fig. 24a) is actuated (open), the coil 3CR is deenergized and the contacts 3CR2 in wire 679 are closed. In this manner, a circuit is completed to energize the coil DIR in wire 677.

Energization of the coil DIR closes the contacts DIR3 in wire 504 (Fig. 24a) and closes the contacts DIR4 in wire 508 to complete a circuit energizing the field coil 275 for the drum indexing motor 272. The contacts DIR2 in wire 503 are also closed to complete a circuit through the wire 501 to energize the armature coil 273 for the motor 272. The motor 272 is thus reversely energized to return the control drum to its original starting position.

At the same time the coil DIR is energized, a circuit is also completed through the wire 680 to energize the release coil 29CR' (Fig. 24c) to reset the ratchet relay to its original starting position in order to control the spindle speeds in the various steps in the cycle to follow.

Resetting the ratchet relay effects closure of the contacts 29CR1 in wire 559 (Fig. 24b), energizing the coil 38CR which then closes its contacts 38CR1 in wire 578. At this time the coil 28CR in wire 626 (Fig. 24c) is energized and the contacts 28CR3 in wire 576 (Fig. 24b) are closed; the coil 13CR in wire 523 is not energized and the contacts 13CR1 in wire 576 are also closed so that a circuit is completed through the wire 552, the wire 576, and the wire 578 to the first spindle speed selector 108 in the first group 104. At the same time, the contacts 13CR2 in wire 577 are open so that none of the circuits to the second group 106 of spindle speed selectors 108 is completed.

At this point it would be well to note that power is supplied through the wire 576 to each of the selectors 108 in the first group 104 of spindle speed selectors, and through the wire 577 to each of the selectors in the second group 106. On beginning a multiple cycle operation, the coil 13CR in wire 523 is not energized since the normally open limit switch 13LS is not actuated. Thus, the contacts 13CR1 in wire 576 are closed. When the control slide 290 is advanced toward the spindle axis at the beginning of the second cycle in a multiple cycle operation, the limit switch 13LS is actuated, energizing the coil 13CR, thus opening the contacts 13CR1 and closing the contacts 13CR2 in wire 577. In this manner, control over the spindle drive clutches is shifted from the first group of selectors after the first cycle to the second group 106.

Wires 578, 579, etc., through 585 lead from the wire 576 to the movable contacts in the selectors 1 through 8, respectively, in the first group 104. The wires 578–585 include switch contacts 38CR1–45CR1 respectively. Control over the spindle drive is determined by which of the contacts 38CR1–45CR1 are closed, and control is shifted from the first selector 108 in the group 104 to successive selectors 108 in the group during succesive steps in a single cycle of operation by means of the ratchet relay latch coil 29CR (Fig. 27) in wire 558 (Fig. 24b). The coil 29CR is succesively energized at the beginning of successive steps in the single cycle of operation and controls contacts 29CR1, 29CR2, etc., in wires 559, 560, etc. to successively energize the coils 38CR, 39CR, etc., through 45CR, also in wires 559, 560, etc., through 565, respectively. Successive energization of the coils 38CR, 39CR, etc., succesively closes the contacts 38CR1, 39CR1, etc., through 45CR1, in wires 578, 579, etc., through 585. The coil 29CR controls the selectors in the second group 106 in a similar manner through the contacts 38CR2, 39CR2, etc., through 45CR2, in wires 603, 604, etc., through 610, leading from the wire 577. The time when and the manner in which the relay coil 29CR is energized to effect a change in the spindle speed is described hereinafter in describing the sequence of operations.

Each of the stationary contacts 1 through 8 in each of the selectors 108 is connected by a wire to one of the wires 595, 596, etc., through 602 which control relay coils 30CR, 31CR, etc., through 37CR. The coils 30CR through 37CR control the energization of the clutch coils in the spindle drive gearing. Thus, referring to the first selector 108 in the first group 104, a wire 586–1 leads from the stationary contact 1 to the wire 595; a wire 586–2 leads from the stationary contact 2 to the wire 596; a wire 586–3 leads from the stationary contact 3 to the wire 597; and a wire 586–4 leads from the stationary contact 4 of the wire 598. In order to simplify the drawings, the wires 586–1 through 586–4 are shown one in back of the other so that only one wire is visible at the place where the reference numeral 586 is applied. It should be understood, however, that there are four separate wires at this point, one behind the other, and that there is no connection between them. In similar fashion, wire 587–5 connects contact 5 to wire 599; wire 587–6 connects contact 6 to wire 600; wire 587–7 connects contact 7 to wire 601; and wire 587–8 connects contact 8 to wire 602. Similarly, referring to the last selector 108 in the second group 106, wire 593–1 connects contact 1 to wire 595; wire 593–2 connects contact 2 to wire 596; wire 593–3 connects contact 3 to wire 597; and wire 593–4 connects contact 4 to wire 598. A wire 618–5 leads from the stationary contact 5 to the wire 599; a wire 618–6 leads from the stationary contact 6 to the wire 600; a wire 618–7 leads from the stationary contact 7 to the wire 601; and a wire 618–8 leads from the stationary contact 8 to the wire 602. Similar connections extend between the stationary contacts of all of the selectors in both groups to the wires 595 through 602. Thus, the stationary contacts 1 through 8 in each of the selectors in both groups are connected respectively to the wires 595 through 602.

Thus, on resetting the ratchet relay (Fig. 27), as described above, the contacts 29CR1 are closed, energizing the coil 38CR1, and closing the contacts 38CR1 in wire 578. Assuming then that the movable contact 109 in the first selector 108 in the first group 104 has been positioned on the stationary contact number 1, a circuit is completed through the wire 586–1 and the wire 595 to energize the coil 30CR in the following manner. On resetting the ratchet relay 29CR, all the coils 30CR through 37CR become deenergized so that all of the normally closed contacts in wire 572 are closed; thus the coil 50CR is energized and the contacts 50CR1 in wire 573 open; the coil 5TR is deenergized and the contacts 5TR2 in wire 575 are closed, energizing the coil 51CR. Thus the contacts 51CR1 in wire 595 are closed to permit energization of the coil 30CR.

On energizing the coil 30CR, its contacts 30CR1 in wire 473 (Fig. 24a) are closed, the contacts 30CR4 in wire 486 are closed, and the contacts 30CR4 in wire 490 are closed, completing circuits through the rheostats in wires 471a and 471b to energize the clutch coils 66', 78' and 90' with a low starting current. In this manner, the drive to the spindle is set for the first step of the first cycle according to the setting of the first selector 108. When the coil 30CR is energized, contacts 30CR2 in wire 476, 30CR3 in wire 480, and 30CR6 in wire 495 are all opened so that none of the clutch coils 68', 77', and 92' can be energized at this time.

On energizing the coil 30CR, the contacts 30CR9 in wire 595a (Fig. 24b) are closed to complete a holding circuit around the contacts 59CR1. At the same time, the contacts 30CR8 in wire 572 are opened, de-energizing the coil 50CR, closing the contacts 50CR1 in wire 573 and energizing the coil 5TR. After a short delay, the contacts 5TR2 in wire 575 are opened, deenergizing the latch coil 51CR. At the same time contacts 5TR2 are opened, contacts 5TR1 in wire 574 are closed, energizing the coil 52CR. This closes the contacts 52CR2 in wire 574a to energize the release coil 51CR1 and reset its contacts. Energization of the coil 52CR also closes the contacts 52CR1 in wire 471 to bypass the resistors in wire 471a and 471b to supply the full curent to the clutch coils.

As previously stated, when the slide reaches its lowermost position, the drum indexing motor 272 (Fig. 10) is energized reversely to return the control drum 240 to its original or starting position. Return rotation of the drum 240 continues until the switch actuating arm on the limit switch 3LS falls into the notch 288' on the periphery of the drum 240, when the limit switch is allowed to close, completing the circuit through wire 511 to energize the coil 3CR.

On energizing the coil 3CR, the contacts 3CR2 in wire 679 (Fig. 24c) are opened, deenergizing the coil DIR. On deenergizing the coil DIR, the contacts DIR3 in wire 504 (Fig. 24a) and the contacts DIR4 in wire 508 are opened, deenergizing the drum indexing motor 272. De-energization of the coil DIR also results in closure of the contacts DIR1 in wire 460 to complete a circuit to the coil 275' which controls the drum indexing brake 275, immediately stopping the rotation of the drum 240.

The control drum is now returned to starting position, positioning the first adjustable stop element 242 (Fig. 10) to control the next movement of the tool slide away from the axis of the spindle to position the slide for the first step to be turned on the workpiece.

Energization of the coil 3CR also results in closing the contacts 3CR1 in wire 652 (Fig. 24c) in circuit to the coil SMR; and deenergization of the coil DIR results in closure of the contacts DIR5 in wire 652. At this time, the limit switch 5LS in the switch box 244 (Fig. 13) is actuated by the lever 256 and spring 257, and the contacts 5LS2 in wire 513 (Fig. 24a) are closed and a circuit is completed to energize the coil 5CR so that the contacts 5CR4 in wire 652 are closed; since the coil 38CR in wire 559 (Fig. 24b) is energized, the contacts 38CR3 in wire 652 (Fig. 24c) are also closed, and the switch 4LS in the switch box 244 is also actuated, closing the contacts in wire 681, energizing the coil 4CR and closing the contacts 4CR3 in wire 652. In this manner, a circuit is completed to energize the coil SMR which results in closure of the contacts SMR4 in wire 711 and closure of the contacts SMR5 in wire 713, energizing the slide drive motor 174 reversely.

When the coil SMR is energized as described above to energize the motor 174 reversely, the limit switch 4LS in wire 651 is closed and the contacts 2CR7 in wire 682 are closed so that the coil 4CR is energized. Thus, the contacts 4CR2 in wire 706 (Fig. 24d) leading from the transformer T4 to the rectifier R3 are closed, taking the full voltage off the transformer T4. The result is that in driving the motor 174 reversely to return the tool slide to its uppermost position away from the spindle axis, the motor is driven at the rapid rate.

The motor 174 is driven reversely until the plunger 260 in the switchbox 244 (Fig. 13) is depressed by the stop element 242 on the drum 240 which has been positioned to control the diameter of the first step to be turned on the workpiece. On depression of the plunger 260, the lever 256 is pivoted to release the switch 4LS, actuate the switch 6LS, and release the switch 5LS, in that order. On releasing the switch 4LS, its contacts in wire 681 return to the normally open position, deenergizing the coil 4CR and opening the contacts 4CR3 in wire 652. This momentarily breaks the circuit to the coil SMR, opening its contacts in circuit to the slide motor 174. The slide motor is momentarily braked electrodynamically and the electrotmagnetic brake 178 is momentarily applied.

Deenergization of the coil 4CR, however, closes the contacts 4CR1 in wire 624 to energize the coil 1TR in wire 624 and the coil 48CR in wire 625. Energization of the coil 48CR opens the contacts 48CR2 in circuit to the coil SMR in wire 652. A short time after the coil 1TR is energized, its contacts 1TR1 in wire 625 are opened to deenergize the coil 48CR, closing the contacts 48CR2 again. Also shortly after the coil 1TR is energized, the contacts 1TR2 in wire 658 are closed, so that a circuit is again made to the coil SMR around the contacts 4CR3. Slide movement then continues until the switch 5LS is released, opening the contacts 5LS2 in wire 513 and deenergizing the coil 5CR. This opens the contacts 5CR4 in wire 652 to again deenergize the coil SMR.

Note that on deenergization of the coil 4CR when the switch 4LS is opened, the contacts 4CR2 in wire 721 (Fig. 24d) are opened and contacts 4CR3 in wire 706 closed to supply a reduced voltage to the slide motor 174. The result is that the last portion of the reverse slide movement is at a reduced constant rate to facilitate stopping the motor with the slide in a predetermined position.

On deenergizing the coil 5CR when the switch 5LS is released, as described above, the contacts 5CR2 in wire 653 are closed to complete a circuit through this wire and the wire 650 to energize the coil SMF, closing its contacts in circuit to the slide motor 174, and energizing the slide motor forwardly.

Forward movement of the slide continues only long enough to allow the pivoted lever 256 to remake the switch 5LS while leaving the switch 4LS released and holding the switch 6LS actuated. On remaking the switch 5LS its contacts 5LS2 in wire 513 close, energizing the coil 5CR. This results in opening the contacts 5CR2 in wire 653, deenergizing the coil SMF and the slide motor 174. On deenergization of the coil SMF, the contacts SMF3 in wire 714 are closed to complete the dynamic braking circuit and the contacts SMF1 in wire 464 are closed to energize the electromagnetic brake coil 178'.

The tool slide is now properly positioned to turn the first step on the workpiece.

In positioning the slide, movement away from the spindle axis and then toward the spindle axis slightly permits any lost motion in gearing to always be taken up in the same manner to always insure accurate positioning of the slide.

On movement of the tool slide to the minimum diameter position, as previously described, the switch 2LS (Fig. 24a) was actuated, closing its contacts in wire 510 energizing the latch coil 2CR, and closing the contacts 2CR1 in wire 512. Then when the limit switch 5LS was released on movement of the slide away from the spindle axis, closing the contacts 5LS1 in wire 512, a circuit was completed to energize the latch coil 18CR. Energization of the coil 18CR results in opening the contacts 18CR2 in wire 652 (Fig. 24c) so that the coil SMR can no longer be energized. But it should be noted at this point that the switch 6LS in the box 244 functions as a safety switch to insure proper positioning of the slide. Thus, on the final short movement of the slide toward the spindle axis, as explained above, if the slide over shoots, that is, if it moves far enough to release the switch 6LS, its contacts in wire 514 are opened, deeneregizing the coil 6CR. This results in closing the contacts 6CR3 in wire 659 to complete a circuit through the wire 652, wire 659, and wire 673 to energize the release coil 18CR'. This would reclose the contacts 18CR2 in wire 652 to repeat the last two steps in positioning the slide, that is, the movement away from the spindle axis, and then return movement toward the spindle axis to the proper position.

On energizing the coil 18CR in wire 512, when the slide is moved away from the spindle axis as described above, the contacts 18CR1 in wire 657 are closed, and on closing the switch 6LS in wire 514 when the slide is moved away from the spindle axis, the coil 6CR is energized, closing the contacts 6CR1 in wire 657. Thus, on energizing the coil 5CR in wire 513, as described above, the contacts 5CR3 in wire 657 are closed, energizing the latch coil 46CR.

On energizing the coil 46CR, contacts 46CR5 in wire 685 are closed, and since the coils 5CR, 6CR and 18CR are now energized, the contacts 5CR6, 6CR4, and 18CR6 in wire 684 are closed, and a circuit is completed to energize the coil CAF in wire 685. This circuit is completed through the contacts APB1 in wire 689. Energization of the coil CAF closes the contacts CAF3 in wire 685 to complete a holding circuit to the coil CAF when the contacts APB1 are opened. The contacts APB1 are opened when the coil APB (Fig. 24d) in wire 740 is energized.

Energization of the coil CAF also closes the contacts CAF7 in wire 732 and CAF8 in wire 735 to energize the carriage drive motor 120 to initiate carriage movement forwardly. At the same time the coil APB in wire 740 is energized, opening the contacts APB1 in wire 689. The coil 15CR in wire 691 is not energized; thus the contacts 15CR3 in wire 746 are closed and the carriage is driven at the slow feed rate.

On initiating carriage movement forwardly, the dog 136b on the control drum 127 clears the switches 11LS and 12LS and they return to normal position, breaking the circuit through wire 520 and deenergizing the coils 11CR; the contacts 11CR7 in wire 673 are thus closed. The coil 27CR in wire 543 is always energized during automatic operation and the contacts 27CR10 in wire 673 are thus closed. The dog 154a on the control disc 150 has not yet actuated the limit switches 8LS and 9LS which are in their normal positions, deenergizing the coil 8CR in wire 517; thus the contacts 8CR5 in wire 673 are closed. Energization of the coil 46CR in wire 657, as described above, effects closure of the contacts 46CR3 in wire 673. Since the contacts 18CR4 in wire 675 are closed at this time, a circuit is completed through the wire 675 to energize the release coil 26CR', closing the contacts 26CR2 in wire 673 and energizing the release coil 18CR'.

Since the release coil 46CR' has not been energized at this time, the contacts 46CR4 in wire 677 remain closed. Energization of the release coil 18CR' effects closure of the contacts 18CR5 in wire 677. Energization of the release coil 26CR' results in opening the contacts 26CR in wire 515, deenergizing the coil 7CR and closing the contacts 7CR2 in wire 677. A circuit is thus completed to energize the coil DIF, closing the contacts DIF2 in wire 501, the contacts DIF3 in wire 504 and the contacts DIF4 in wire 508 to energize the drum indexing motor 272 forwardly to index the drum 240 and present a succeeding stop element 242 in position to control the next withdrawal of the tool slide to determine the diameter of the next step turned on the workpiece. Indexing movement of the drum 240 continues until the switch actuating arm on the switch 7LS falls into the next notch 288 on the drum 240.

On initiating movement of the drum 240, the first notch 288 moves with the drum sleeve 240' and the circumference of the sleeve then actuates the switch 7LS, closing the contacts 7LS2 in wire 516 and energizing the latch coil 26CR. On energizing the coil 26CR, the contacts 26CR1 in wire 515 are closed.

When the switch actuating arm on the switch 7LS falls into the second notch 288 on the drum 240, the switch 7LS returns to normal position, and the contacts 7LS1 in wire 515 are closed to energize the coil 7CR. Energization of the coil 7CR opens the contacts 7CR2 in wire 677 to deenergize the coil DIF. On deenergizing the coil DIF, its contacts in circuit to the drum indexing motor 272 are opened to deenergize the motor, and the contacts DIF1 in wire 460 are closed to energize the brake coil 275'.

The control drum 240 is now indexed with the second stop element 242 in position to control the second step to be turned on the workpiece. The drum indexing motor remains inactive then until the turning of the next step on the workpiece has begun, when it is again indexed in a similar manner.

On indexing the control drum 240, the first stop element 242 clears the plunger 260 in the switch box 244, and if the second stop element is shorter than the first, the lever 256 is pivoted by the spring 257 and the switches 4LS and 5LS are actuated and the switch 6LS released. Thus the contacts 4CR3 and 5CR4 in wire 652 in circuit to the coil SMR are closed. However, the coil SMR cannot be energized to start the slide drive motor 174 since the contacts 11CR4 in wire 650 and the contacts 8CR2 in wire 656 are both open at this time. The contacts 11CR4 are opened when carriage movement begins, moving the dog 136b clear of switches 11LS and 12LS, in wires 520 and 521, and deenergizing the coils 11CR. The contacts 8CR2 are open since the dog 154a (Fig. 22) on the disc 150 has not yet actuated the switch 9LS in wire 517 to energize the coil 8CR.

Since the coils 8CR and 11CR are both deenergized, the contacts 8CR6 and 11CR9 in wire 685 are both closed, maintaining the circuit to the coil CAF through these contacts.

The length of the first step turned on the workpiece is determined by the position of the dog 154a on the disc 150, and movement of the carriage continues until the dog 154a actuates the switches 8LS and 9LS. The switch 8LS is actuated a moment before the switch 9LS, and its contacts in wire 509 are closed to energize the coil 53CR. This closes the contacts 53CR2 in wire 750 to alter the output of the unit 725 and slow the carriage motor. On actuating the switch 9LS, a circuit is completed through the wire 517 to energize the coil 8CR opening the contacts 8CR6 in wire 685 and deenergizing the coil CAF. Deenergization of the coil CAF results in opening the contacts CAF7 in wire 732 and the contacts CAF8 in wire 735 to deenergize the carriage drive motor 120.

On deenergizing the coil CAF, the contacts CAF2 in wire 619 are closed to complete a circuit to the coil DBB, closing the contacts DBB1 in wire 738. In this manner a circuit is completed through the dynamic braking resistor 739 in wire 738, so that the power generated on continued rotation of the armature 120' is dissipated through the resistor 739, producing a dynamic braking effect and bringing the armature to a stop.

On deenergizing the coil CAF, the contacts CAF' in wire 466 are also closed to complete a circuit to the brake coil 126' in order to apply the carriage feed screw brake 126. The combined effects of the dynamic and electromagnetic braking insure that the carriage is immediately stopped in the desired position.

The first step on the workpiece is thus turned.

On energizing the coil 8CR in wire 517 when the switch 9LS is actuated by the dog 154a, the contacts 8CR1 in wire 558 are closed to again energize the ratchet relay latch coil 29CR to open the contacts 29CR1 in wire 559 and to close the contacts 29CR2 in wire 560. This results in deenergization of the coil 38CR in wire 559 and energization of the coil 39CR, thus opening the contacts 38CR1 in wire 578 and closing the contacts 39CR1 in wire 579. In this manner, control over the spindle drive is shifted from the first selector 108 in the group 104 to the second selector. The coil 30CR in wire 595 is thus deenergized and, depending on the setting of the movable contact 109 in the second selector, one of the coils 30CR through 37CR will be energized. Assuming the movable contact 109 in the second selector 108 has been set on the stationary contact 2, a circuit is then completed through the wire 587-2, and the wire 596 to energize the coil 31CR. Energization of the coil 31CR effects closure of the contacts 31CR2 in wire 477, contacts 31CR4 in wire 487, and contacts 31CR5 in wire 491, thus energizing the clutch coils 68', 78', and 90'. Note also that the contacts 31CR1 in wire 472, the contacts 31CR3 in wire 480, and the contacts 31CR6 in wire 495 are all open so that none of the coils 66', 77' and 92' can be energized.

The spindle drive is thus conditioned according to the predetermined selection in preparation for the second step to be turned on the workpiece.

On energizing the coil 8CR, as described above at the end of the first carriage movement, the contacts 8CR2 in wire 656 and the contacts 8CR3 in wire 658 are closed; and on energizing the latch coil 26CR in wire 516, as described above, the contacts 26CR3 in wire 658 are closed, thus completing a circuit through the contacts 12CR5 in wire 650, the wire 656, the wire 652, the wire 658, and the wire 652 to energize the coil SMR. Energization of this coil effects closure of the contacts SMR4 in wire 711 and SMR5 in wire 713 to reversely energize the slide drive motor 174 so that the slide is moved away from the spindle axis. At this time, the coil 4CR in wire 681 is energized since the switch 4LS is closed and the contacts 1LS2 in wire 681 are closed. Thus, the contacts 4CR2 in wire 721 are closed and the rectifier R3 is supplied with the full voltage from the transformer T4.

Movement of the slide away from the spindle axis continues until the plunger 260 in the switchbox 244 on the slide engages the second stop element 242 on the drum 240 which has been positioned to control the slide for the second step to be turned on the workpiece. On engagement of the plunger 260 with the stop element 242, the switch 4LS is first released, as described above in the first positioning of the slide, to slow the slide motor, then the switch 6LS is actuated, and finally the switch 5LS is released. Releasing the switch 5LS is effective to stop the slide motor and also to reverse it for the slight return movement toward the spindle axis for the final positioning. When the switch 5LS is again actuated, the movement of the slide toward the spindle axis is terminated and the slide is thereby positioned as described in the first positioning, except that the final position is controlled by a stop element of different length than in the first case.

The slide is thus positioned in readiness for the second step to be turned on the workpiece.

Movement of the carriage is begun again and the control drum 240 is indexed again, both in a manner similar to that previously described. The operations described above may be repeated to turn as many as 8 steps of different diameters on the workpiece according to the setting of the dogs 154a on the disc 150 and the dog 136a on the control drum 127. In the first cycle, however, which is a roughing operation, it may be necessary to turn only a few of the possible eight steps on the work. As illustrated in the layout of Fig. 22, which shows the relative positions of the control dogs, only two steps are to be turned in the first cycle. Thus, as shown, the dog 136a which actuates the switch 10LS to control return movement of the carriage in the first cycle, is set opposite the dog 154b, which determines the length of the second step turned on the work.

Then, on actuation of the switch 9LS by the dog 154b, the coil 8CR in wire 517 is energized. And, at the same time, on actuation of the switch 10LS by the dog 136a, the latch coil 10CR in wire 528 is energized; this coil remains energized until the end of a multiple cycle operation, so that actuation of the switch 10LS in subsequent cycles has no effect. On closing the switch 10LS, circuits are also completed through the wire 528, the wire 529 and the wire 526 to energize the release coil 46CR', and through the wires 526, 527 and 525 to energize the release coil 2CR'.

Energization of the coils 8CR and 46CR', as described above, opens the contacts 8CR6 and 46CR5 in wire 685 too, deenergizing the coil CAF and the carriage drive motor 120. The motor and carriage are immediatly brought to a stop by means of the electrodynamic and electromagnetic circuits previously described.

Energization of the release coil 2CR', as described above, results in opening the contacts 2CR5 in wire 652 so that the coil SMR can not be energized through this wire to reversely drive the slide motor and withdraw the slide. But on energization of the coils 10CR and 46CR', as described above, the contacts 10CR3 and 46CR1 in wire 660 are closed, and a circuit is completed through the wires 660 and 652 to the coil SMR. This effects energization of the slide drive motor 174 reversely to withdraw the slide away from the spindle axis.

Withdrawal of the slide at the end of the total carriage movement in any cycle is controlled by the stop element 242 which has been indexed to next control the slide positioning. If only two steps are turned in the first cycle, the third stop element 242 controls the withdrawal; if eight steps are turned, the ninth stop element controls. The final stop element should always be shorter than any preceding one in order that the tool slide will always withdraw to a relief position during return movement of the carriage.

Withdrawal movement of the slide continues until the switches 4LS and 5LS are actuated, deenergizing the coils 4CR and 5CR, opening the contacts 4CR3 and 5CR4 in wire 652, and deenergizing the coil SMR. Since the contacts 11CR4 in wire 650 and the contacts 2CR4 in wire 656 are open at this time the coil SMF cannot be energized and the slide remains in the withdrawn position during return movement of the carriage.

Energization of the coils 46CR' and 2CR' also result in closure of the contacts 46CR6 and 2CR9 in wire 690. At this time, the contacts 21CR3 in wire 690 are closed; the coil CAF is deenergized and the contacts CAF4 in wire 690 are closed, completing a circuit to the coil CAR through the wire 651, the contacts 27CR10 in wire 673, wire 678, wire 685, the contacts APB1 in wire 689 and the wire 690. Energization of the coil CAR closes the contact CAR6 and CAR7 in circuit to the carriage drive motor 120 to energize this motor reversely to effect return movement of the carriage. At the same time the coil CAR is energized, the coil 15CR in wire 691 is also energized, closing the contacts 15CR2 in wire 748 and opening the contacts 15CR3 in wire 746. The carriage is thus driven at the rapid rate during return movement.

On return movement of the carriage, the control drum 127 is reversely rotated and carriage movement continues until the dog 136b is again positioned to actuate the switches 11LS and 12LS. On closing the switches 11LS and 12LS, a circuit is completed through the wire 520 and the wire 522 to energize the coils 11CR, opening the contacts 11CR10 in the wire 690 which results in deenergization of the coil CAR and the carriage motor 120. Deenergization of the coil CAR closes the contacts CAR2 in wire 619 to energize the dynamic braking coil DBB which effects closure of the contacts DBB1 in circuit with the dynamic braking resistor 739 so that the motor 120 is slowed to a stop. The contacts CAR1 in wire 466 are also closed to energize the brake coil 126'.

The first cycle of operation is thus completed.

Energization of the coils 10CR and 11CR, as described above, effects closure of the contacts 10CR1 and 11CR1 in wire 533 to energize the latch coil 24CR, closing the contacts 24CR7 in wire 653. Thus while energization of the coil 10CR opens the contacts 10CR2 in wire 652, closure of the contacts 24CR7 in wire 653 energizes the coil SMF to move the tool slide toward the spindle axis again to the minimum diameter position. Thus, the second cycle of operation is initiated.

On movement of the slide to the minimum diameter position, the switch 2LS is actuated, as before, energizing the latch coil 2CR in wire 510. This closes the contacts 2CR2 in wire 558, and since the contacts 24CR3 in wire 568 were previously closed on energization of the coil 24CR, the solenoid 11BS in wire 568 is energized to admit fluid to the cylinder 294 to shift the control slide 290 downwardly nearer to the spindle axis. This positions the control drum 240 and the stop elements 242 nearer the spindle axis so that in the second cycle the slide is positioned nearer the spindle axis in each step, thus effecting the removal of a second layer of material in the first two steps.

On shifting the control slide 290, the dog 299 actuates the switch 13LS in wire 523, completing a circuit to the coil 13CR. Energization of the coil 13CR results in opening the contacts 13CR1 in wire 576 and effects closure of the contacts 13CR2 in wire 577, so that control over the spindle drive is now shifted from the first group 104 of spindle speed selectors 108 to the second group 106. Thereafter operation continues as described above in the first cycle.

The second cycle, which is a semi-finishing operation, may include turning as many as eight steps on the workpiece. But, as illustrated in Fig. 22, it includes only five steps. Thus, the dog 136d which controls return of the carriage in the second cycle is set opposite the dog 154e which controls the length of the fifth step turned on the work.

Thus, when the switch 9LS is actuated by dog 154e the coil 8CR in wire 517 is energized; and when the switch 14LS is actuated by the dog 136d, the latch coil 14CR in wire 530 is energized, closing the contacts 14CR1 in wire 529 and energizing the release coils 2CR' and 46CR' in wires 525 and 526, as at the end of the first cycle. This is effective to stop the carriage advance, withdraw the slide for return movement, and return the carriage to starting position. The circuit to coil SMR in wire 652 is completed through the contacts 14CR5 in wire 661 to effect withdrawal of the tool slide. The latch coil 14CR remains energized until the end of the multiple cycle operation, so that actuation of the switch 14LS in the third cycle has no effect.

At the end of the carriage return movement, the switches 11LS and 12LS are actuated, energizing the coils 11CR in wires 520 and 522, closing the contacts 11CR1 in wire 533. When the slide was withdrawn away from the spindle axis, the switch 5LS was released and the coil 5CR in wire 513 deenergized, closing the contacts 5CR1 in wire 533; and on energization of the coil 14CR, the contacts 14CR2 in wire 534 are closed to energize the latch coil 25CR. This effects closure of the contacts 25CR4 in wire 571 to energize the solenoid 12BS which is effective to admit fluid to the cylinder 194 to index the tool turret.

On indexing the tool turret, the limit switch 15LS is released to return to its normal position, and the switch 16LS is actuated, closing the contacts 16LS2 in wire 653 and energizing the coil SMF. The coil SMF is effective, as previously described, to advance the tool slide toward the spindle axis, and the third cycle of operation is initiated.

As illustrated, all eight steps are turned in the third cycle, which is the finishing operation. Thus the dog 136e, which controls return of the carriage in the third cycle, is set opposite the dog 154h, which controls the length of the eighth step turned. Thus, when the switch 9LS is actuated by the dog 154h, the coil 8CR in wire 517 is energized; and when the switch 17LS is actuated by the dog 136e, the latch coil 17CR in wire 532 is energized, closing the contacts 17CR1 in wire 527' to energize the release coils 2CR' and 46CR' again. This is effective as in the previous cycles to stop the carriage advance, withdraw the tool slide, and return the carriage to its original or starting position. The circuit to the coil SMR is completed through the contacts 17CR4 in wire 662 to effect withdrawal of the tool slide.

Energization of the coils 11CR at the end of the carriage return stroke is effective to open the contacts 11CR3 in wire 631, deenergizing the coil 28CR in wire 626 and opening the contacts 28CR5 in wire 632 to deenergize the coil 12CR. This also opens the contacts 28CR3 in wire 576, deenergizing the spindle drive clutches and interrupting control over the clutches by the selectors 108. Deenergization of the coil 28CR is also effective to close the contacts 28CR1 in wire 493 and the contacts 28CR2 in wire 499, so that both of the clutch coils 90' and 92' in the change gear unit 154 are energized. This connects gears of different sizes to the coasting spindle shaft, and brakes the spindle to a stop.

On deenergizing the coil 12CR at the end of the last carriage return stroke, as described above, the contacts 12CR1 in wire 535 are closed. At the end of the carriage return stroke the switches 11LS and 12LS are closed to energize the coils 11CR in wires 520 and 522, thus closing the contacts 11CR1 in wire 533. When the spindle slows down, the speed switch 113 in wire 567 is opened, deenergizing the coil 22CR and closing the contacts 22CR1 in wire 535. This results in completing a circuit to energize the release coils 10CR', 14CR', 17CR', 24CR' and 25CR' to reset all contacts controlled by these coils. Thus the contacts 24CR4 in wire 569 and the contacts 25CR3 in wire 570 are closed, energizing the solenoids 11AS and 12AS and returning the control slide 290 and the tool turret to the original position.

The multiple cycle operation is now complete and the switch 5MS may now be set manually to close the contacts 5MS2 in wire 546, energizing the latch coil 9CR, closing the contacts 9CR2 in wire 550 to energize the solenoid 10BS to withdraw the tailstock center and release the workpiece.

While the operation described hereinabove relates to an automatic three-cycle operation, the switch 6MS in wire 627 may be set manually to provide an automatic 2-cycle operation. If a 2-cycle operation is desired, the switch is set to open the contacts 6MS1 and to close the contacts 6MS2. Thus, at the end of the return stroke of the carriage in the second cycle, when the switches 11LS and 12LS are actuated and the coil 25CR in wire 534 is energized, as described in the 3-cycle operation, to index the tool turret, the contacts 25CR5 in wire 631 will be opened and the circuit broken to the coils 28CR in wire 626 and 12CR in wire 632.

Deenergization of the coil 28CR results in opening the contacts 28CR3 in wire 576, interrupting the spindle drive and closing the contacts 28CR1 in wire 493 and the contacts 28CR2 in wire 499 to brake the spindle, as described hereinabove.

When the spindle slows down, the speed switch 113 in wire 567 is opened, deenergizing the coil 22CR and closing the contacts 22CR1 in wire 535, after which the circuit is operable as in the 3-cycle operation to wind up the automatic operation of the lathe.

If an automatic single cycle operation is desired, the switch 6MS is set to close the contacts 6MS1 and to open the contacts 6MS2. Thus at the end of the return stroke of the carriage in the first cycle, when the switches 11LS and 12LS are actuated, and the coil 24CR in wire 533 is energized, as in the operation previously described, to shift the control slide 290, the contacts 24CR5 in wire 631 are opened, deenergizing the coils 28CR and 12CR, after which the circuit is operable as in a 2-cycle operation to wind up the operation of the lathe.

Describing now the facing tool operation, as illustrated in Fig. 22, the dog 136c on the control drum 127 is set to actuate the limit switch 23LS to initiate the facing tool movement at some time after the second cycle of operation has begun and before the end of the carriage feed stroke in this cycle.

When the switch 23LS in wire 638 (Fig. 24c) is actuated in the second cycle, a circuit is completed through the wire 638 to energize the latch coil 23CR, closing the contacts 23CR1 in wire 641 to energize the coil FDF. Actuation of the switch 23LS in the first and third cycles has no effect because the contacts 24CR6 in wire 638 are not closed until the beginning of the second cycle, and contacts 14LS3 are opened at the end of the carriage feed stroke in the second cycle. Energization of the coil FDF effects closure of the contacts FDF7 and FDF8 in wires 766 and 769, respectively (Fig. 24d) to energize the facing tool drive motor 300 forwardly to move the facing tool toward the workpiece.

At the time the switch 23LS is actuated, the coil 47CR in wire 647 (Fig. 24c) is energized through the contacts 23CR3 in wire 647. When the coil 23CR is energized the contacts 23CR3 are opened, but the coil 47CR remains energized through the switch 19LS and the contacts 47CR1, both in wire 649. Since the coil 47CR is energized, the contacts 47CR2 in wire 778 (Fig. 24d) are closed and the contacts 47CR3 in wire 776 are open. The maximum reference voltage is thus supplied across wires 776 and 777 and the control unit 725' supplies a high voltage to the armature circuit for the facing tool drive motor 300. The tool is thus moved at a rapid approach rate toward the work.

Forward movement of the facing tool continues at the rapid rate until the control dog 322 (Fig. 21) engages the switch 19LS, opening the switch and deenergizing the coil 47CR. The contacts 47CR2 are opened and the contacts 47CR3 closed, so that the output of the control unit 725' is altered to supply a reduced voltage to the armature circuit for the motor 300, and the facing tool is thus driven at a feed rate during cutting.

Forward movement of the facing tool at the feed rate continues until the switch 20LS is actuated by the dog 324, opening the contacts 20LS1 in wire 641 and deenergizing the coil FDF. At the same time, the contacts 20LS2 in wire 642 are closed, energizing the release coil 23CR' and closing the contacts 23CR2 in wire 646 to energize the coil FDR. This effects closure of the contacts FDR7 and FDR8, reversely energizing the motor 300 to return the facing tool. Energization of the release coil 23CR' also closes the contacts 23CR3 in wire 647 to energize the coil 47CR, so that the facing tool is driven at the rapid rate during return movement.

Return movement of the facing tool continues until the dog 326 actuates the limit switch 21LS, completing a circuit through the wire 524 to energize the coil 21CR. Energization of the coil 21CR results in opening the contacts 21CR1 in wire 646, deenergizing the coil FDR and opening the contacts FDR7 and FDR8 to deenergize the motor 300. Deenergization of the coil FDR also effects closure of the contacts FDR2 in wire 622 to energize the dynamic braking coil DBC, closing the contacts DBC1 in wire 772 to dynamically brake the motor 300. At the same time, the contacts FDR1 in wire 462 are closed to energize the brake coil 312', to apply the brake 312 on the worm shaft 308.

Summary

At this point, a summary of the mechanical operation will be given, referring to the movable parts of the machine, their movements, and actuation of the various limit switches, without reference specifically to switch contacts, coils, wires and relays. Assuming the lathe has been properly set up to perform an automatic 3-cycle step turning operation to produce on a workpiece steps of increasing diameter toward the head stock, such an operation is normally begun with the tailstock center 40 retracted, with the carriage 24 at the limit of its return stroke near the tailstock, with the tool slide 26 withdrawn upwardly away from the spindle axis, with the control drum 240 in the last position to which it was indexed in the previous operation, with the control slide 290 in its upper retracted position, with the tool turret 28 indexed to present the roughing tool 30 to a work engaging position, and with the facing tool 34 in a withdrawn position.

First, a workpiece is placed in position adjacent the spindle 18, and the manually settable switch 5MS is closed to advance the tailstock center 40 and clamp the work in position. Next, the spindle motor 44 is energized by manually depressing the "start" switch button 1PBS which also energizes a holding circuit to maintain the motor energized after the switch button is released. At this point, rotation of the spindle is initiated by depressing the "cycle start" push button switch 3PBS. This causes energization of the spindle clutches, and also initiates the automatic multiple cycle operation which continues to its finish without further manual intervention. The switch 3PBS is held depressed until the spindle attains a sufficient r.p.m. for the speed switch 113 to close, whereupon a holding circuit is energized and the switch may be released.

When the holding circuit is completed by the speed switch 113, the slide motor 174 is energized forwardly to cause advance of the tool slide 26 toward the spindle axis at a rapid rate. At this time, the tool slide moves to a minimum diameter position controlled by limit switches 1LS and 2LS (Fig. 3) on the carriage 24. These switches are actuated by a dog 183 on the tool slide. The switch 1LS is actuated a moment before the switch 2LS and slows the slide motor 174 before its stoppage, and then the switches 1LS and 2LS deenergize the slide motor and also energize the dynamic braking circuit for the motor and energize the mechanical brake 178 on the slide drive screw 172 so that the slide is immediately stopped.

Actuation of the switches 1LS and 2LS also energizes a coil to reset the ratchet relay (Figs. 27 and 28) to effect a spindle speed according to the setting of the movable contact 109 in the first spindle speed selector 108 in the first group 104 of selectors.

Actuation of the switches 1LS and 2LS occurs at a time when the tool slide and the switch box 244 have been moved away from the control drum 240, and on actuation of the switch 1LS, the drum indexing motor 272 is energized reversely to reset the control drum 240. Return movement of the drum continues until the switch arm of the limit switch 3LS (Fig. 10) drops into the notch 288′ (Fig. 12) whereupon the drum indexing motor is deenergized and the brake 275 on the drum indexing worm 274 is energized. The drum is immediately stopped, with the first stop 242 on the control drum positioned to control the first diameter to be turned on the work. In the example assumed, the first stop 242 is the longest, and controls the smallest diameter turned on the work.

Actuation of the limit switch 3LS also causes energization of the slide motor 174 reversely, moving the slide 26 away from the spindle axis at a rapid rate. Reverse movement of the slide continues until the switch plunger 260 in the switch box 244 on the slide 26 engages the first stop 242. Engagement of the plunger 260 with the stop 242 causes actuation of the limit switches 4LS and 5LS in that order. The switch 4LS momentarily deenergizes the slide motor and energizes the dynamic and mechanical braking means to slow the slide and the motor. After a moment's delay, a timer relay causes reenergization of the slide motor at a slow rate, and slide movement continues until the switch 5LS is released by a lever 256 (Fig. 13). Release of the switch 5LS reverses the slide motor 174 and the slide 26 moves toward the spindle axis for a moment, until lever 256 remakes the switch 5LS, deenergizing the motor 174 and applying the braking means. The tool slide is now positioned for the first step to be turned on the workpiece.

Remaking of the switch 5LS on the final slide movement as described above causes energization of the carriage drive motor 120 forwardly at a slow feed rate. When the carriage movement is initiated, the dog 136b (Fig. 22) on the drum 127 moves off the limit switches 11LS and 12LS, allowing these switches to return to their normal positions, and these switches cause energization of the drum indexing motor 272 forwardly to position the next stop 242 to control the second diameter turned on the workpiece. Drum indexing continues until the switch arm on the limit switch 7LS drops into the second notch 288 (Fig. 12) deenergizing the motor 272 and energizing the brake 275.

The length of the first step turned on the work is determined by the position of the dog 154a on the control disk 150. Carriage movement continues until the dog 154a actuates the limit switches 8LS and 9LS. The switch 8LS is actuated a moment before the switch 9LS and slows the carriage motor, after which the switch 9LS deenergizes the carriage motor and energizes the dynamic braking circuit for the motor and the mechanical brake 126 on the carriage feed screw 124, stopping the carriage. The turning of the first step on the workpiece is completed at this point.

On actuation of the switch 9LS at the end of the first step, control of the spindle speed clutches is shifted to the second selector 108 in the first group of selectors.

Actuation of the switch 9LS also causes energization of the slide motor 174 reversely, causing movement of the slide 26 away from the spindle axis. As in the positioning of the slide for the first step as described above, the slide moves away from the spindle axis and then slightly toward the spindle axis to a position determined by the second stop 242.

The positioning of the slide 26 again initiates carriage movement, and carriage movement again causes indexing of the control drum 240, this time to position the third stop 242.

The steps described repeat themselves for as many times as is necessary to complete the rough turning of the steps desired in the first cycle of operation as determined by the setting of dog 136a on the drum 127. As illustrated, the first cycle includes the turning of only two steps on the workpiece, and the dog 136a is set opposite the dog 154b. Thus, at the end of the second step on the workpiece, the switches 8LS and 9LS are actuated by the dog 154b and the switch 10LS is actuated by the dog 136a. Actuation of the switches 8LS, 9LS and 10LS causes deenergization of the carriage motor 120, energization of the slide motor 174 reversely to withdraw the tool slide to a relief position, and energization of the carriage motor 120 reversely at a rapid rate to return the carriage toward the tailstock. The slide is withdrawn until the switches 4LS and 5LS are actuated, whereupon the slide motor is deenergized, leaving the tool slide in a withdrawn position for carriage return. This withdrawal of the tool slide is determined by the stop 242 which had been indexed just previously into a control position for actuating the switch plunger 260.

Return movement of the carriage continues until the switches 11LS and 12LS are actuated by the dog 136b on the drum 127, deenergizing the carriage motor and energizing the dynamic and mechanical braking means for stopping the carriage. At this point the first cutting cycle in the multiple cycle operation has been completed.

Actuation of the switches 11LS and 12LS causes energization of the slide motor 174 to move the slide again to the minimum diameter position determined by limit switches 1LS and 2LS when these are actuated by the control dog 183.

Actuation of the switch 2LS causes admission of fluid to the lower end of the control cylinder 292 (Fig. 10), moving the control slide 290 downwardly on the carriage 24 toward the spindle axis to a position determined by engagement of the stop 297 with the stop 298. This positions the entire slide 290, the control drum 240, and all the stop members 242 nearer the spindle axis so that the same stops as those used in the first cycle now are positioned to enable their use again in taking a second cut on the workpiece.

Movement of the control slide 290 downwardly causes dog 299 to actuate the switch 13LS (Fig. 10), shifting control over the spindle speed clutches from the first group 104 of spindle speed selectors to the second group 106, so that the second group of selectors controls the spindle speeds to the end of the multiple cycle operation.

While the slide 290 is being positioned and the spindle speed changed, actuation of the switch 1LS has initiated return indexing of the control drum 240, in the same manner as occurred at the beginning of the first cycle of operation. Return movement of the control drum continues until the switch 3LS is actuated, stopping the drum indexing motor, causing movement of the slide 26 outwardly away from the spindle axis and initiation of the new cycle which continues as the first.

The number of steps turned in the second cycle of operation is determined by the positioning of the control dog 136d on the drum 127 (Fig. 22). As illustrated, the dog 136d is set opposite the dog 154e, so that five steps are turned on the work in the second cycle. At the end of the fifth step, the switch 14LS is actuated by the dog 136d and the switches 8LS and 9LS are actuated by the dog 154e. Actuation of these switches terminates forward movement of the carriage, causes withdrawal of the tool slide to a relief position, and return movement of the carriage toward the tailstock. As before, return movement of the carriage continues until the limit switches 11LS and 12LS are actuated by the dog 136b, stopping the carriage. At this point, the second cycle of the 3-cycle operation has been completed.

Actuation of the facing tool 34 preferably occurs in the second cycle of operation under control of the dog 136c on the drum 127. As illustrated, the dog 136c is positioned to cause actuation of the facing tool while the second step is being turned in the second cycle. The dog 136c actuates the limit switch 23LS which in turn causes energization of the facing tool drive motor 300 forwardly at the rapid rate. As the facing tool moves toward the work, the control rod 320 moves to the left is viewed in Fig. 21. When the dog 322 engages the limit switch 19LS this switch is actuated to slow the drive motor 300 to a feed rate, whereupon movement of the facing tool continues until the dog 324 actuates the switch 20LS energizing the motor 300 reversely at a rapid rate. Return of the facing tool continues until the dog 320 actuates the switch 21LS deenergizing the motor 300 and energizing the dynamic and mechanical braking means, stopping the facing tool.

At the end of carriage return movement in the second cycle of operation as described above, the limit switches 11LS and 12LS are actuated, and at this time actuation of these switches causes admission of fluid to the turret indexing cylinder 194 to index the finishing tool 32 into work engaging position. Indexing of the turret causes actuation of the limit switch 16LS (Fig. 15), and actuation of 16LS initiates movement of the tool slide 26 toward a minimum diameter position as described before, thereby initiating the third cycle. The third cycle continues, with the finishing tool in position to take a third cut on the work.

The number of steps turned on the work during the third cycle is determined by the setting of the control dog 136e on the drum 127. As illustrated, the dog 136e is positioned opposite the dog 154h on the disk 150 so that eight steps will be turned on the work. At the end of the last step, the switches 8LS and 9LS are actuated by the dog 154h, and the switch 17LS is actuated by the dog 136e. Actuation of these switches causes deenergization of the carriage motor, withdrawal of the tool slide and energization of the carriage motor reversely at a rapid return rate.

At the end of carriage return movement, when the switches 11LS and 12LS are actuated by the dog 136b, the spindle drive clutches are deenergized, control over the spindle clutches by the selectors 108 is interrupted, and clutch coils of the spindle drive are energized to brake the spindle to a stop. When the spindle slows sufficiently, speed switch 113 is opened, and this causes resetting of certain of the control relays in preparation for the next operation of the lathe. Opening of the speed switch 113 also causes admission of fluid to the cylinders 292 and 194 to return the control slide 290 upwardly to its withdrawn position and return indexing of the tool turret to position the roughing tool 30 in work engaging position.

The 3-cycle operation has been completed and the manually settable switch 5MS may be opened to withdraw the tailstock center 40 and release the work for removal.

*Manual operation*

Under some circumstances, it may be desirable to manually effect the various steps in the operation of the lathe which are automatically effected as described above. In order to permit such operation, the circuit includes various push button switches through which the various operations described above may be effected in successive step-by-step fashion.

In order to operate the lathe under these circumstances, the various adjustable parts on the lathe may be adjusted as described above in preparing for automatic operation. The various elements on the lathe, such as the carriage, the tool slide and the like are in the positions described above on beginning automatic operation.

First, the switch 1MS in wire 454 is closed as in automatic operation. The switch 6MS in wire 627 set to provide for the desired number of cycles, as in automatic operation.

The first notable distinction over automatic operation is that the switch 4MS in wire 543 is not closed when manual operation is desired so that the coil 27CR is not energized during this operation.

The switch 2MS in wire 540 must be set before each cycle in manual operation in order that the desired cycle may be performed. Thus, before the first or roughing cycle, the switch is set to open both its contacts 2MS1 and 2MS2. Before the semi-finish cycle it is set to close the contacts 2MS1, and before the third or finish cycle both the contact 2MS1 and 2MS2 are closed.

Next, the switch 5MS is set to close the contacts 5MS1 in wire 545 to advance the tailstock center to clamp a properly positioned workpiece for rotation with the spindle, as in automatic operation.

In order to initiate the operation, the switch 3PBS is depressed to close the contacts 3PBS1 in wire 626 to energize the coil 28CR as in automatic operation. Since the coil 27CR is never energized during manual operation, the contacts 27CR3 in wire 632 are open and the coil 12CR in wire 632 is never energized during manual operation. On energizing the coil 28CR, the contacts 28CR3 in 576 are closed to energize the spindle clutches and initiate rotation of the spindle, as in automatic operation.

In order to position the tool slide, the switch 7PBS is depressed to close the contacts 7PBS1 in wire 664 to energize the coil 1CR. The contacts 7PBS3 in wire 676 are closed at the same time, and energization of the coil 1CR closes the contacts 1CR6 in wire 676, thus completing the circuit energizing the release coil 18CR' in wire 673. Energization of the coil 18CR' closes the contacts 18CR3 in wire 668 to complete a holding circuit through the now closed contacts 1CR2 in wire 666, so that the coil 1CR remains energized when the contacts 7PBS1 are opened on releasing the switch 7PBS.

Energization of the coil 1CR effects closure of the contacts 1CR1 in wire 656, completing the circuit through this wire, the wire 651 and the wire 650 to energize the coil SMF which is effective to advance the tool slide toward the spindle axis as in automatic operation. The slide is advanced toward the spindle axis as in automatic operation to a minimum diameter position, actuating the switches 1LS and 2LS, energizing the coil 2CR in wire 510 and opening the contacts 2CR3 in wire 650 to deenergize the coil SMF.

On actuating the switch 1LS, the contacts 1LS1 in wire 679 are closed, energizing the coil DIR in wire 679 and the drum indexing motor 272 to return the control drum 240 to its original or starting position, as in automatic operation. The release coil 29CR' in wire 680 is energized at the same time the coil DIR is energized, in order to reset the ratchet relay as described in automatic operation.

Reverse or return rotation of the control drum 240 continues until the drum reaches its original or starting position, whereupon the switch 3LS in wire 511 is closed as in automatic operation, energizing the coil 3CR and opening the contacts 3CR2 in wire 679 to deenergize the coil DIR. This is effective to deenergize the drum indexing motor 272.

Energization of the coil 3CR and deenergization of the coil CIR is effective as in automatic operation to close the contacts 3CR1 in wire 652 and DIR5 in wire 652 to energize the coil SMR and reversely energize the slide drive motor 174 to withdraw the tool slide away from the spindle axis. Reverse movement of the slide away from the spindle axis continues as in automatic operation until the switches 4LS and 5LS are released deenergizing the coils 4CR, 5CR and opening the contacts 4CR3 and 5CR4 in wire 652 to deenergize the coil SMR. At the same time, contacts 5CR2 in wire 653 are closed, energizing the coil SMF. Forward movement of the slide continues only long enough for the plunger 260 in the switch box 244 to remake the switch 5LS when the coil 5CR is again energized opening the contacts 5CR2 in wire 653 to deenergize the coil SMF. The slide is thus properly positioned for the first step to be turned on the workpiece.

When the switch 5LS is released at the upper limit of the slide travel as described above, the contacts 5LS1 in wire 512 are closed, energizing the latch coil 18CR and closing the contacts 18CR1 in wire 657. Then on downward movement of the slide to remake the switch 5LS, the contacts 5LS2 are closed and the switch 6LS is held actuated, energizing the coils 5CR and 6CR, closing the contacts 5CR3 and 6CR1 in wire 657 to energize the latch coil 46CR, as in automatic operation.

Energization of the coils 5CR, 6CR, 18CR, and 46CR, is effective to open the contacts 5CR5 in wire 666, the contacts 6CR2 in wire 667, the contacts 18CR3 in wire 668, and the contacts 46CR2 in wire 669 to break the circuit to the coil 1CR.

Energization of the coils 5CR, 6CR, 18CR, and 46CR, is also effective to close the contacts 5CR6, 6CR4, and 18CR6 in wire 684 and the contacts 46CR5 in wire 685. While in automatic operation of the lathe, the closure of these contacts was effective to energize the coil CAF to initiate carriage movement, in manual operation, the contacts 12CR5 in wire 650 and the contacts 1CR1 in wire 656 are now open so that no circuit can be completed through the wire 651, and the wire 678 to the wire 685.

Thus in order to initiate the carriage movement, the switch 8PBS is depressed to close the contacts 8PBS1 in wire 687, completing the circuit through this wire and the wire 688 to the wire 685 and thus energize the coil CAF to initiate carriage movement forwardly. Energization of the coil CAF closes the contacts CAF5 in wire 688 to complete a holding circuit around the contacts 8PBS1 so that the coil CAF will remain energized when the switch 8PBS is released.

On movement of the carriage forwardly the dog 136b (Fig. 22) clears the limit switches 11LS and 12LS, deenergizing the coils 11CR in wires 520 and 522. This results in closing the contacts 11CR7 in wire 673 to energize the release coils 26CR' and 18CR', in that order, as in automatic operation.

Energization of the coil 18CR' effects closure of the contacts 18CR5 in wire 677 to energize the coil DIF, which results in indexing the control drum as in automatic operation.

Carriage movement forwardly is continued until the dog 154a on the control-disc 150 actuates the switches 8LS and 9LS. As in automatic operation, the switch 8LS is actuated a moment before the switch 9LS and is effective to slow down the carriage drive motor. Also as in automatic operation, the switch 9LS, on actuation, completes a circuit through wire 517 to energize the coil 8CR, opening the contacts 8CR6 in wire 690 to deenergize the coil CAF and stop the carriage. At the same time, the contacts 8CR1 in wire 558 are closed to energize the ratchet relay coil 29CR to shift control of the spindle speed to the second selector 108, as in automatic operation.

Energization of the coil 8CR at this time is not effective as in automatic operation to energize the coil SMR in wire 652 and reposition the slide since the contacts 12CR5 in wire 650 and 1CR1 in wire 656 are both open. Instead, in order to reposition the slide for the second step to be turned, the switch 7PBS is again depressed, closing the contacts 7PBS1 in wire 664 to energize the coil 1CR which then closes its contacts 1CR1 in wire 656 to energize the coil SMR through the wires 656, 658 and 652. Movement of the slide away from the spindle axis and then toward the spindle axis to position it for the second step follows as described above in first positioning the slide.

Carriage movement is again initiated by depressing the switch 8PBS as before.

These steps are repeated until the desired number of steps are turned on the workpiece in the first cycle. When the switch 9LS is actuated at the end of the last step turned, the coil 8CR in wire 517 is energized as in automatic operation. The contacts 8CR6 in wire 685 are thus opened to deenergize the coil CAF and stop carriage movement.

In order to withdrawn the tool slide for return movement of the carriage, the switch 6PBS is depressed, closing the contacts 6PBS2 in wire 663 to energize the coil SMR which energizes the slide motor reversely. Withdrawal of the slide continues, as in the automatic operation until the switches 4LS and 5LS are released and the switch 6LS is made, deenergizing the coils 4CR and 5CR, and opening the contacts 4CR3 and 5CR4 in wire 652 to deenergize the coil SMR.

In order to return the carriage to the original starting position, the switch 9PBS is depressed to close the contacts 9PBS2 in wire 692 and energize the coil 16CR. This closes the contacts 16CR1 in wire 525 to energize the release coils 2CR' and 46CR' to reset their contacts. Energization of the coil 16CR also closes the contacts 16CR6 in wire 692a to complete a circuit to the coil CAR which reversely energizes the carriage drive motor to return the carriage.

Return movement of the carriages continues as in automatic operation until the dog 136b actuates the switches 11LS and 12LS energizing the coils 11CR in wires 520 and 522. This opens the contacts 11CR10 in wire 690 to deenergize the coil CAR and stop the carriage.

The first cycle is thus completed.

At the end of the carriage feed stroke in the first cycle, the switch 10LS is closed by the dog 136a, energizing the latch coil 10CR in wire 528 and closing the contacts 10CR1 in wire 533. And, on withdrawal of the tool slide for return movement of the carriage the switch 5LS is released, opening the contacts 5LS2 in wire 513 to deenergize the coil 5CR and close the contacts 5CR1 in wire 533. Then, on actuation of the switches 11LS and 12LS at the end of the return stroke of the carriage, the coils 11CR are energized, closing the contacts 11CR1 in wire 533 to energize the latch coil 24CR.

Energization of the latch coil 10CR opens the contacts 10CR2 in wire 650, but energization of the coil 24CR closes the contacts 24CR7 in wire 653, so that on depressing the switch 7PBS to position the slide and initiate the second cycle, the coil SMF will be energized through the wire 653.

To initiate the second cycle, the switch 2MS in wire 540 is set to close the contacts 2MS1, and the switch 7PBS is depressed, closing the contacts 7PBS1 in wire 664 and energizing the coil 1CR as before.

On movement of the slide to the minimum diameter position, the switch 2LS is actuated, energizing the latch coil 2CR in wire 510 and closing the contacts 2CR2 in wire 558. This energizes the solenoid 11BS in wire 568 to shift the control slide 290 nearer the spindle axis, as in automatic operation.

On shifting the slide 290, the switch 13LS is actuated, opening the contacts 13CR1 in wire 576 and closing the contacts 13CR2 in wire 577 to shift control over the spindle clutches to the second group of selection 108, as in automatic operation.

Thereafter the second cycle is completed as the first, described above.

At the end of the carriage stroke in the second cycle, the switch 14LS is actuated by the dog 136d (Fig. 22), energizing the latch coil 14CR in wire 530, and closing the contacts 14CR2 in wire 534. Thus on actuating the switches 11LS and 12LS at the end of the carriage return stroke in the second manually controlled cycle, the contacts 11CR1 in wire 533 are again closed. This effects energization of the coil 25CR in wire 534, closing the contacts 25CR4 in wire 571 to energize the solenoid 12BS and index the tool turret in preparation for the third cycle.

Energization of the coil 14CR opens contacts 14CR4 in wire 650 but energization of the coil 25CR closes the contacts 25CR6 in wire 653. Then, on indexing the tool turret the switch 16LS is actuated, opening the contacts 16LS1 in wire 650 and closing the contacts 16LS2 in wire 653. Thus, on depressing the switch 7PBS to position the slide and initiate the third cycle, the coil SMF is energized through wire 653.

The third cycle is initiated by setting the switch 2MS in wire 540 to close the contacts 2MS2 and by depressing the switch 7PBS to energize the coil 1CR, and follows as in the first cycle.

At the end of the total carriage feed movement in the third cycle, the switch 17LS is closed, energizing the coil 17CR in wire 532 and opening the contacts 17CR2 in wire 627. Then at the end of the carriage return stroke the switch 11LS is closed energizing the coils 11CR and opening the contacts 11CR3 in wire 631. This deenergizes the coil 28CR in wire 626, and winds up the operation as in automatic operation.

Actuation of the switch 23LS in wire 638 (Fig. 24c) in manual operation of the lathe is not effective to initiate movement of the facing tool as in automatic operation; because the contacts 27CR5 in wire 638 are open and no circuit can be completed through these contacts to energize the coil 23CR.

Instead, to actuate the facing tool, the push button switch 4PBS is depressed during the second cycle to close the contacts 4PBS1 in wire 633 and complete a circuit to the coil 23CR through wire 633. Energization of the coil 23CR effects forward movement of the facing tool as in automatic operation.

In order to return the facing tool, the switch 5PBS is depressed to close the contacts 5PBS2 in wire 643 and 5PBS3 in wire 645. This energizes the release coil 23CR' in wire 642 and the coil FDR in wire 646 and return movement follows as in automatic operation.

We claim:

1. A step-turning lathe comprising a frame; a bed supported on the frame; a rotary work-supporting spindle on the frame; a variable speed drive for the spindle controllable to rotate the spindle at different predetermined speeds; a carriage mounted on the bed for reciprocal movement longitudinally of the spindle axis; a tool support mounted on the carriage for reciprocal movement transversely of the spindle axis; means controlling the carriage and the tool support to automatically move the same through successive step turning cycles wherein each cycle includes intermittent movements of the carriage from a starting position through a cutting stroke, return movement of the carriage to the starting position after each cutting stroke, and transverse movement of the tool support between the intermittent movements of the carriage in the cutting stroke and wherein the cutting strokes of the carriage in successive cycles are successively longer, said control means including a rotatable control disc, driven in proportion to carriage movement, and having dogs for controlling the carriage to determine the length of intermittent carriage movements and consequently the length of steps cut on a workpiece, a rotatable control drum, driven in proportion to the carriage movement, and having dogs for controlling the carriage to determine the length of cutting strokes of the carriage in successive cycles, a rotatable control member, mounted on the carriage, and having an annular series of axially adjustable elements for controlling the tool support to limit movement of the support toward and away from the spindle axis to determine the diameter of steps cut on a workpiece, means for indexing the control member to position succeeding elements for determining the diameter of succeeding steps to be cut, a slide mounting the control member on the carriage for movement transversely of the spindle axis, means actuated after the first cycle for moving the control member nearer the spindle axis to control the slide movements during the succeeding cycle with the tool support in advance positions nearer the spindle axis; controlling the spindle drive to automatically rotate the spindle at different predetermined speeds during different steps in one cycle, and during each of the steps in said one cycle, at a speed different from the corresponding steps in another cycle.

2. In a step-turning lathe having a bed, a rotary work-supporting spindle, a carriage mounted on the bed for reciprocal movement longitudinally of the spindle axis, a reversible electric motor for driving the carriage, a tool slide mounted on the carriage for reciprocal movement transversely of the spindle axis and a reversible electric motor for driving the slide, in combination, means controlling the carriage motor and the slide motor to automatically move the carriage and slide through successive step turning cycles wherein each cycle includes intermittent movements of the carriage from a starting position through a cutting stroke, return movement of the carriage to the starting position after each cutting stroke, and transverse movement of the slide between the intermittent movements of the carriage in the cutting stroke, said control means including a rotatable control disc, driven in proportion to carriage movement, and having dogs for controlling the carriage motor to determine the length of intermittent carriage movements and consequently the length of steps cut on a workpiece and to initiate slide movement away from the workpiece axis, a rotatable control member, mounted on the carriage, and having an annular series of axially adjustable elements for controlling the slide motor to limit movement of the slide toward and away from the spindle axis to determine the diameter of steps cut on a workpiece, means actuated at the limit of inward movement of the slide to start the carriage motor and to index the control member to position a succeeding element for determining the diameter of a succeeding step to be cut, means mounting the control member on the carriage for movement transversely of the spindle axis, and a reversible motor actuated at the end of the return stroke of the carriage in the first cycle for moving the control member support nearer the spindle axis to control the slide movements during the succeeding cycle with the tool slide nearer the spindle axis.

3. In a step-turning lathe having a bed, a rotary work-supporting spindle, means for driving the spindle including change speed gearing which may be controlled to drive the spindle at selective predetermined speeds, a carriage mounted on the bed for reciprocal movement longitudinally of the spindle axis, and a tool slide mounted on the carriage for movement transversely of the spindle axis, in combination, means for automatically controlling the carriage and the tool slide to automatically move through a first step turning cycle, and then through a second step-turning cycle with the tool slide in advanced positions nearer the spindle axis, wherein each cycle includes intermittent movement of the carriage from a starting position through a cutting stroke, return movement of the carriage to the starting position after each cutting stroke, and transverse movement of the tool slide between the intermittent movements of the carriage in the cutting stroke to dispose the slide in stepped positions relative to the spindle axis during successive movements of the carriage, and means controlling the change speed gearing to automatically rotate the spindle at preselective predetermined speeds during successive movements of the carriage in the cutting stroke in the first cycle and at different preselective predetermined speeds during successive movements of the carriage in the cutting stroke in the second cycle.

4. The combination as defined in claim 3 wherein said change speed gearing includes change speed units connected in series, each unit including gears arranged in parallel for alternative connection in the spindle drive and electromagnetic devices respectively for connecting the different gears to the spindle drive, whereby the various electromagnetic devices in the various units may be energized in various combinations to rotate the spindle at different predetermined speeds; and wherein said means for automatically controlling the change speed gearing comprises two groups of spindle speed selectors, one for each cycle, each group including selectors corresponding in number to the intermittent movements of the carriage during a cutting stroke, each of said selectors including stationary contacts connected respectively in circuit to energize said electromagnetic devices in one of the various combinations and a manually settable contact for preselectively completing a circuit through one of the stationary contacts, means actuated at the end of each of said carriage movements for shifting control of the electromagnetic devices from one selector to the next and means actuated after the first cycle to shift control of the electromagnetic devices from one group to the other group of selectors.

5. In a lathe, a rotary work-supporting spindle, a tool support, means controlling the tool support to automatically move the same relative to the spindle through successive work cycles, each cycle including movement of the tool support from a starting position through a plurality of cycle steps and return to the starting position, means for driving the spindle including change speed gearing which may be controlled to drive the spindle at different predetermined speeds, means for automatically controlling the change speed gearing to rotate the spindle at different predetermined speeds during successive steps in each cycle and, during each of the steps in one cycle, at a predetermined speed different from the speed during the corresponding step in another cycle.

6. In a lathe, the combination as defined in claim 5, wherein the change speed gearing includes electromagnetic devices which may be alternatively energized to drive the spindle at different predetermined speeds and wherein said means for automatically controlling the change speed gearing includes a group of spindle speed selectors for each of the work cycles, each group including a selector for each of the steps in a cycle, each selector including a manually operable member for controlling said electromagnetic devices to preselect one of said predetermined speeds, means actuated after each step in a cycle for shifting control of the electromagnetic devices from one selector to the next, and means actuated after a cycle to shift control of the electromagnetic devices from one group of selectors to the next.

7. In a step turning lathe, in combination, a carriage mounted for reciprocal movement, a tool slide mounted on the carriage for movement transversely of the direction of carriage movement, a tool slide follower movably mounted on the tool slide, a bar extending in the direction of carriage movement and engageable by the tool slide follower, means urging the follower to engage the bar, means including a motor for adjusting the slide with respect to the tool slide follower, switches on on the slide for controlling the motor, an indexable drum mounted on the carriage and having stops for actuating the slide control switches, means mounting the indexable drum for bodily movement on the carriage with respect to the slide between first and second positions to control the slide during first and second similar cutting cycles on the same workpiece, and means for moving the drum bodily on the carriage to the second position for a second cutting cycle.

8. In a lathe, a rotary work supporting spindle, a tool support, means controlling the tool support to automatically move the same through successive work cycles, each cycle including movement of the tool support from a starting position through a plurality of cycle steps and return to the starting position, a variable speed drive for the spindle which may be controlled to drive the spindle at different predetermined speeds including change speed gear units connected in series, each unit including gears arranged in parallel for alternative connection in the spindle drive and electromagnetic devices respectively for connecting the different gears to the spindle drive, whereby the various electromagnetic devices in the various units may be energized in various combinations to rotate the spindle at different predetermined speeds, means for controlling the spindle drive to rotate the spindle at different predetermined speeds during successive steps in each cycle comprising a group of spindle speed selectors for each of the work cycles, each group including a selector for each of the steps in a cycle, each selector including stationary contacts one for each of the various combinations in which the electromagnetic devices may be energized and a manually settable contact for preselectively completing a circuit through one of the stationary contacts, a group of relays each connected in circuit with one of the stationary contacts of each selector in each group, each of said relays controlling contacts connected in circuit with said electromagnetic devices to energize the devices in one of the various combinations, means for shifting control of the electromagnetic devices from one selector to the next after each step in a cycle, and means to shift control of the electromagnetic devices from one group of selectors to the next after each cycle.

9. In a step turning lathe having a rotary work spindle, a first slide movable longitudinally of the spindle axis, and a tool slide movable on the first slide transversely of the spindle axis, in combination, means for controlling the slides to move through a step turning cycle including successive unidirectional movements of the first slide longitudinally of the spindle axis and transverse movement of the tool slide to dispose the tool slide at stepped positions relative to the spindle axis during successive movement of the first slide, comprising, switch means on one of said slides for controlling the position of said tool slide, an indexable control member mounted on the other slide and having a series of control elements facing said switch means and engageable therewith for actuating the same on relative movement between the slides thereby to control respectively the stepped positions of the second slide, means for indexing the control member to successively position said control elements for actuating said switch means, means mounting said switch means and said control member for adjustment relative to each other in a direction transverse to the spindle axis, and means responsive to movement of the first slide for effecting said relative adjustment after a first step turning cycle to effect positioning of said tool slide during a second similar step turning cycle at stepped positions each nearer the spindle axis than the corresponding stepped position in the first cycle.

10. In a step turning lathe having a rotary work spindle, a first slide movable longitudinally of the spindle axis, and a tool slide movable on the first slide transversely of the spindle axis, in combination, means for controlling movement of the tool slide to dispose the same at different positions on the first slide, comprising, switch means on one of said slides for controlling the position of the tool slide including a switch actuating plunger, an indexable control member mounted on the other slide and having a series of elements engageable with said switch actuating plunger on relative movement between the slides to control the position of the tool slide, means for adjusting said control elements on said control member so that successive elements engageable with said plunger project successively shorter distances toward said plunger, means for indexing the control member to successive position successively shorter control elements for engagement with the plunger to produce successively larger diameters on a workpiece, each of said control elements having a beveled end portion, and said switch actuating plunger having a beveled end portion engageable with the beveled end portions of said control elements, whereby successive control elements may be adjusted to project successively greater distances toward said plunger within the range permitted by said beveled end portions for producing successively smaller diameters on a workpiece.

11. In a lathe, a rotary work supporting spindle, a movable tool support, means for controlling the tool support to move relative to the spindle through at least two successive work cycles, each cycle including movement of the tool support from a starting position through a plurality of steps and return to the starting position, variable speed drive means for rotating the spindle at different predetermined speeds, presettable means controlling the drive means to automatically rotate the spindle at preselective speeds during successive steps in the first cycle, and additional presettable means controlling the drive means to automatically rotate the spindle at preselective speeds during successive steps in the second cycle.

12. In a lathe, a rotary work supporting spindle, a movable tool support, means for controlling the tool support to move relative to the spindle through successive work cycles, each cycle including movement of the tool support from a starting position through a plurality of steps and return to the starting position, variable speed drive means for rotating the spindle at different predetermined speeds, and means for automatically controlling the drive means to rotate the spindle at preselective predetermined speeds during the steps of at least two successive work cycles including, at least two groups of spindle speed selectors, one group for each of two work cycles, each group including a plurality of spindle speed selectors, one selector for each of the steps in a work cycle, each selector controlling said variable speed drive means and including means for preselecting any one of a plurality of predetermined spindle speeds, means actuated after each step in the first work cycle for shifting control of the variable speed drive means from one selector to the next selector in the first group of selectors, means actuated after the first work cycle to shift control of the variable speed drive means from the first group of selectors to the second group of selectors, and means actuated after each step in the second work cycle for shifting control of the variable speed drive from one selector to the next selector in the second group of selectors.

13. A step turning lathe, comprising, a rotary work spindle, a base slide movable in one direction relative to the spindle axis, a tool slide movable on the base slide in a direction transverse to the direction of movement of the base slide, drive means for moving the base slide, drive means for moving the tool slide, means controlling the base slide drive means to automatically effect movement of the base slide through similar successive intermittent cutting strokes all beginning at the same starting position and each stroke including movements of predetermined length, means controlling the tool slide drive means to effect positioning of the tool slide on the base slide before each base slide movement in a cutting stroke to produce a workpiece having a plurality of different diameters, means mounting the tool slide control means for adjustment, and means responsive to movement of said base slide for adjusting the tool slide control means after a first cutting stroke of the base slide to effect positioning of the tool slide during a second cutting stroke in positions each nearer the work than the tool slide position for the corresponding base slide movement in the first cutting stroke.

14. In a step turning lathe, in combination, a rotary work supporting spindle, a carriage reciprocable in one direction relative to the spindle axis, a tool slide reciprocable on the carriage in a direction transverse to the path of carriage movement, a tool holder on the tool slide for supporting a cutting tool, and means controlling the carriage and the tool slide to automatically move the tool through a first step turning cycle to turn a series of axially spaced portions of different diameters on the work and then through a second, similar, step turning cycle with the tool slide and consequently the tool in advanced positions nearer the work to take a second cut on each of said portions of the work, wherein each cycle includes intermittent movement of the carriage from a starting position through a cutting stroke, return movement of the carriage to the starting position after each cutting stroke, and transverse movement of the tool slide intervening the intermittent movements of the carriage in the cutting stroke to dispose the tool in stepped positions corresponding respectively to the different work diameters to be turned during successive carriage movements.

15. In a step turning lathe having a spindle, a carriage reciprocable longitudinally of the spindle axis, and a tool support reciprocable on the carriage transversely of the spindle axis, in combination, means controlling the carriage and the tool support to automatically move the same through a first step turning cycle and then through a second step turning cycle with the tool support in advanced positions nearer the spindle axis, wherein each cycle includes intermittent movement of the carriage from a starting position through a cutting stroke, return movement of the carriage to the starting position after each cutting stroke, and transverse movement of the tool support intervening the intermittent movements of the carriage in the cutting stroke to dispose the tool support at stepped positions relative to the spindle axis during successive movements of the carriage, thereby to turn a series of axially spaced portions of different diameters on the work, said means comprising, motor means for moving the tool support on the carriage, switch means on said tool support for controlling the motor means, a switch actuating plunger on the tool support for actuating the switch means, an indexable control drum on the carriage having an annular series of axially adjustable control elements engageable with said plunger on movement of the tool support relative to the carriage thereby to control the stepped positions of said tool support, means for indexing the drum to successively position said control elements for engagement with said plunger, an adjustable slide on the carriage supporting said drum for movement toward and away from said plunger, means for adjusting said slide, and means responsive to movement of said carriage at the end of a first step turning cycle for energizing said adjusting means to position said adjustable slide nearer the spindle axis, thereby to position said drum to effect positioning of the tool support during the second step turning cycle at stepped positions each nearer the spindle axis than the corresponding stepped position in the first cycle.

16. In a step turning lathe, in combination, a rotary work supporting spindle, a carriage reciprocable longitudinally of the spindle axis, a tool support reciprocable on the carriage transversely of the spindle axis, motor means for moving the tool support on the carriage, switch means on said tool support for controlling the motor means, a switch actuating plunger on the tool support for actuating the switch means, an indexable control drum on the carriage having an annular series of axially adjustable control elements engageable with said plunger on movement of the tool support relative to the carriage thereby to control the position of said tool support, means for indexing the drum to successively position said control elements for engagement with said plunger, an adjustable slide on the carriage supporting said drum for movement toward and away from said plunger, and a piston and cylinder device for adjusting said slide.

References Cited in the file of this patent

UNITED STATES PATENTS

| | | |
|---|---|---|
| 1,750,589 | Groene | Mar. 11, 1930 |
| 2,032,598 | Shaw | Mar. 3, 1936 |
| 2,317,522 | Curtis | Apr. 27, 1943 |
| 2,359,064 | Van Hamersveld | Sept. 26, 1944 |
| 2,359,255 | Smith | Sept. 26, 1944 |
| 2,410,026 | Groene | Oct. 29, 1946 |
| 2,450,096 | Siekmann | Sept. 28, 1948 |
| 2,534,333 | Wyrick | Dec. 19, 1950 |
| 2,545,053 | Siekmann | Mar. 13, 1951 |
| 2,557,896 | Soule | June 19, 1951 |
| 2,568,977 | Baillod | Sept. 25, 1951 |
| 2,575,792 | Bullard | Nov. 20, 1951 |
| 2,621,396 | Gracchi | Dec. 16, 1952 |
| 2,630,038 | Buell | Mar. 3, 1953 |
| 2,632,353 | Montanus | Mar. 24, 1953 |
| 2,641,151 | Lee | June 9, 1953 |
| 2,677,285 | Volk | May 4, 1954 |
| 2,713,283 | Lomazzo | July 19, 1955 |

FOREIGN PATENTS

| | | |
|---|---|---|
| 179,459 | Austria | Sept. 10, 1954 |
| 739,804 | Great Britain | Nov. 2, 1955 |
| 1,087,004 | France | Feb. 18, 1955 |